US008133109B2

(12) United States Patent
Oomori

(10) Patent No.: US 8,133,109 B2
(45) Date of Patent: Mar. 13, 2012

(54) GAME SYSTEM AND CONTROLLING METHOD THEREOF

(75) Inventor: Tomoaki Oomori, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 443 days.

(21) Appl. No.: 12/115,925

(22) Filed: May 6, 2008

(65) Prior Publication Data

US 2009/0233677 A1 Sep. 17, 2009

Related U.S. Application Data

(60) Provisional application No. 61/035,888, filed on Mar. 12, 2008.

(51) Int. Cl.
*A63F 13/00* (2006.01)

(52) U.S. Cl. ................ 463/20; 463/16; 463/25; 463/29; 273/138.1; 273/139

(58) Field of Classification Search .......... 463/1, 10–13, 463/16–21, 23, 25–27, 29–34; 273/138.1, 273/138.2, 139, 141 A, 142 B, 142 C, 142 J, 273/148 R, 429–432
See application file for complete search history.

(56) References Cited

U.S. PATENT DOCUMENTS

| | | | | |
|---|---|---|---|---|
| 5,178,390 | A | 1/1993 | Okada | |
| 5,280,909 | A | 1/1994 | Tracy | |
| 5,564,700 | A | 10/1996 | Celona | |
| 5,851,011 | A * | 12/1998 | Lott | 273/292 |
| 6,113,493 | A * | 9/2000 | Walker et al. | 463/25 |
| 6,142,872 | A * | 11/2000 | Walker et al. | 463/16 |
| 6,203,430 | B1 * | 3/2001 | Walker et al. | 463/20 |
| 6,416,409 | B1 | 7/2002 | Jordan | |
| 6,523,829 | B1 * | 2/2003 | Walker et al. | 273/292 |
| 6,604,999 | B2 | 8/2003 | Ainsworth | |
| 6,773,345 | B2 * | 8/2004 | Walker et al. | 463/17 |
| 6,796,898 | B1 * | 9/2004 | Timpano | 463/12 |
| 6,808,452 | B2 * | 10/2004 | Baerlocher et al. | 463/17 |
| 6,811,483 | B1 * | 11/2004 | Webb et al. | 463/16 |
| 7,387,571 | B2 * | 6/2008 | Walker et al. | 463/26 |
| 7,568,973 | B2 * | 8/2009 | Iddings et al. | 463/25 |
| 7,585,222 | B2 * | 9/2009 | Muir | 463/25 |
| 7,713,124 | B2 * | 5/2010 | Cuddy et al. | 463/26 |
| 7,753,775 | B2 * | 7/2010 | Yoshizawa | 463/20 |
| 7,780,521 | B2 * | 8/2010 | Inamura | 463/25 |
| 7,887,410 | B2 * | 2/2011 | Okada | 463/20 |

(Continued)

*Primary Examiner* — Arthur O. Hall
(74) *Attorney, Agent, or Firm* — KMF Patent Services, PLLC; Kenneth M. Fagin, Esq.

(57) ABSTRACT

A game system of the present invention has a plurality of gaming machines capable of communicating with each other via a communication line. The plurality of gaming machines each have an input device operable to input an insurance BET. The plurality of gaming machines carry out the following processing. The plurality of gaming machines set a predetermined value to be shared among the plurality of gaming machines. The gaming machines count the insurance BET thus input and sum up the insurance BET number accumulated in the plurality of gaming machines. Then, the plural types of symbols displayed on the display are automatically re-arranged. The gaming machines count the number of times for a game on a one-game basis and at the same time, sums up the number of times for the game accumulated in the plurality of gaming machines. As a result of repeating a game, if it is judged that the total number of times for the game in the plurality of gaming machines has reached the predetermined value set in advance, a prize including the resulting total insurance BET is awarded to at least one gaming machine from among the plurality of gaming machines.

12 Claims, 17 Drawing Sheets

U.S. PATENT DOCUMENTS

| | | | | |
|---|---|---|---|---|
| 7,972,208 | B2 * | 7/2011 | Okada | 463/20 |
| 7,985,135 | B2 * | 7/2011 | Fujimoto et al. | 463/26 |
| 8,021,225 | B2 * | 9/2011 | Okada | 463/20 |
| 8,025,563 | B2 * | 9/2011 | Okada | 463/20 |
| 8,033,907 | B2 * | 10/2011 | Okada | 463/20 |
| 8,062,118 | B2 * | 11/2011 | Okada | 463/20 |
| 8,083,579 | B2 * | 12/2011 | Okada | 463/20 |
| 8,083,580 | B2 * | 12/2011 | Okada | 463/20 |
| 2002/0065124 | A1 | 5/2002 | Ainsworth | |
| 2007/0105609 | A1 * | 5/2007 | Okada | 463/16 |
| 2008/0113779 | A1 * | 5/2008 | Cregan | 463/27 |
| 2008/0214275 | A1 * | 9/2008 | Okada | 463/20 |

* cited by examiner

FIG.4

| CODE NO. | SYMBOL | SYMBOL | SYMBOL | SYMBOL | SYMBOL |
|---|---|---|---|---|---|
| 00 | EARTH | JUPITER | SATURN | VENUS | MARS |
| 01 | A | EARTH | JUPITER | SATURN | VENUS |
| 02 | Q | A | EARTH | JUPITER | SATURN |
| 03 | J | Q | A | EARTH | JUPITER |
| 04 | K | J | Q | A | EARTH |
| 05 | SUN | K | J | Q | A |
| 06 | MERCURY | SUN | K | J | Q |
| 07 | MARS | MERCURY | SUN | K | J |
| 08 | VENUS | MARS | MERCURY | SUN | K |
| 09 | SATURN | VENUS | MARS | MERCURY | SUN |
| 10 | JUPITER | SATURN | VENUS | MARS | MERCURY |
| 11 | EARTH | JUPITER | SATURN | VENUS | MARS |
| 12 | A | EARTH | JUPITER | SATURN | VENUS |
| 13 | Q | A | EARTH | JUPITER | SATURN |
| 14 | J | Q | A | EARTH | JUPITER |
| 15 | K | J | Q | A | EARTH |
| 16 | SUN | K | J | Q | A |
| 17 | MERCURY | SUN | K | J | Q |
| 18 | MARS | MERCURY | SUN | K | J |
| 19 | VENUS | MARS | MERCURY | SUN | K |
| 20 | SATURN | VENUS | MARS | MERCURY | SUN |
| 21 | JUPITER | SATURN | VENUS | MARS | MERCURY |

FIG.5

SCATTER PRIZE

| SYMBOL | NUMBER OF SYMBOLS DISPLAYED ON DISPLAY DEVICE | | |
|---|---|---|---|
| | THREE | FOUR | FIVE |
| A | 2 | 4 | 6 |
| J | 4 | 8 | 12 |
| K | 6 | 12 | 18 |
| Q | 8 | 16 | 24 |
| MERCURY | 10 | 20 | 30 |
| MARS | 20 | 40 | 60 |
| VENUS | 30 | 60 | 100 |
| SUN | 40 | 80 | 120 |
| SATURN | 50 | 100 | 200 |
| JUPITER | 70 | 140 | 280 |
| EARTH | TRIGGER SYMBOL FOR SPECIAL PRIZE | | |

※PAYOUT NUMBER OF COINS FOR ONE COIN ENTRY

GAME SELECTION PROCESSING

GAME SYSTEM AND CONTROLLING METHOD THEREOF

CROSS-REFERENCE TO RELATED APPLICATIONS

This application claims priority of U.S. Provisional Application No. 61/035,888 filed on Mar. 12, 2008. The contents of this application are incorporated herein by reference in their entirety.

BACKGROUND OF THE INVENTION

1. Field of the Invention

The present invention relates to a game system and a controlling method thereof.

2. Description of the Related Art

Conventionally, a game system is provided with a plurality of slot machines and a server device which are connected so as to allow communication therebetween via a communication line. A part of the gaming media inserted in each slot machine are accumulated in a cumulative manner in the server device, and a payout (JACKPOT) inclusive of the gaming media accumulated in the server device is awarded to each slot machine in accordance with a game outcome at each slot machine. Related conventional art is disclosed, for instance, in U.S. Pat. Nos. 6,416,409-B2, 5,280,909-B2 and 5,564,700-B2.

In conventional slot machines, apart from inserting coins to start a game, coins for insurance are also inserted, and a predetermined insurance premium is awarded if the invested value consumed with each execution of the game reaches a predetermined accumulated value. This is disclosed in U.S. Pat. No. 5,178,390, for instance.

In the conventional slot machines, if a predetermined combination of symbols is displayed in a stopped state along a payline, a predetermined number of gaming media are then paid out in accordance with the combination of symbols. Regardless of the payline, further, a predetermined number of gaming media are paid out, corresponding to the number of specific symbols referred to as scatter symbols, which were displayed on the display device. This is disclosed, for example, in U.S. Pat. Nos. 6,604,999-B2 and US 2002-065124-A1.

The present invention provides a game system and a controlling method thereof, which can offer entertainability to players that has not been successfully attained by those of the aforementioned conventional art.

SUMMARY OF THE INVENTION

According to a first aspect of the present invention, there is provided a game system having the following configuration. The game system has a plurality of gaming machines capable of communicating with each other via a communication line. The plurality of gaming machines, each have: (i) a display device onto which a plurality of types of symbols are arranged; (ii) an input device operable to input an insurance BET; (iii) at least one memory; and (iv) a controller. The controller is configured to: (a) store a predetermined value to be shared among the plurality of gaming machines, in the memory; (b) accept an insurance BET input from the input device; (c) count the insurance BET accepted in an accumulative manner and, store a value of the counted insurance BET in the memory; (d) carry out transmission and reception of insurance BET information stored in the memory, with other gaming machines; (e) sum up insurance BET numbers stored in the plurality of gaming machines, based on insurance BET information received from said other gaming machines, and store the value of the summing-up result in the memory; (f) automatically re-arrange the plurality of types of symbols arranged on the display device; (g) count a number of times for the game on a one-game basis, in an accumulative manner, and store the counted value in the memory; (h) carry out transmission and reception of information concerning the number of times for the game, the information being stored in the memory, with said other gaming machines; (i) sum up the number of times for the game in the plurality of gaming machines, based on the information on the number of times for the game received from said other gaming machines, and store the value of the summing-up result in the memory; (j) judge whether, as a result of repeating the processing at the itemized (b) to (i), a total number of times for the game resulting from the summing-up processing at the itemized (i) reaches the predetermined value stored at the itemized (a); and (k) award a prize to at least one gaming machine from among the plurality of gaming machines at which the predetermined value was stored at the itemized (a), said prize including the total insurance BET stored at the itemized (i), if it is judged, as a result of said judgment at the itemized (j), that the total number of times for the game reaches the predetermined value.

According to the first aspect of the present invention, judgment on whether the total number of times for the game reaches the predetermined value set in advance is made based on the plurality of gaming machines. This reduces the time required to reach the predetermined value, as compared to the case judgment is made based on one gaming machine, making it possible to swiftly award a prize, as an insurance function, to the players. This insurance prize includes the insurance BET which was counted at the plurality of gaming machines in an accumulative manner. Accordingly, the prize is set to a higher payout than that in the case of one gaming machine, offering to the players payouts employing an insurance function which was not successfully achieved in the conventional art.

According to a second aspect of the present invention, there is provided a game system having the following configuration. The game system according to the first aspect further includes a central display device capable of communicating with the plurality of gaming machines and operable to display a predetermined common game. The controller, at the itemized (k), if it is judged, as a result of said judgment at the itemized (j), that the total number of times for the game reaches the predetermined value stored at the itemized (a), displays the common game on the central display device and awards a prize to at least one gaming machine from among the plurality of gaming machines at which the predetermined value was stored at the itemized (a), based on an outcome of the common game that was displayed and executed, said prize including the total insurance BET stored at the itemized (i).

According to the second aspect of the present invention, a prize employing the insurance function is carried out based on the outcomes of the common game executed in the plurality of gaming machines, making it possible to award prizes to the players based on equal conditions. The common game is displayed and executed on the central display, making it possible to provide a display which is visually shared by the players.

According to a third aspect of the present invention, there is provided a game system having the following configuration. In the game system according to the first aspect, the plurality of gaming machines each have: a first table for distributing said prize to the plurality of gaming machines; and a second table for awarding said prize to a predetermined gaming machine. The controller, at the itemized (k), if it is judged, as a result of said judgment at the itemized (j), that the total number of times for the game reaches the predetermined value stored at the itemized (a), selectively switches between the first table and the second table, based on a request from at least one gaming machine from among the plurality of gaming machines and awards a prize to at least one gaming machine from among the plurality of gaming machines at which the predetermined value was stored at the itemized (a), based on the table that was selectively switched, said prize including the total insurance BET stored at the itemized (i).

According to the third aspect of the present invention, a prize employing the insurance function can be awarded only to the specific gaming machine, or can be awarded by distribution to the plurality of gaming machines, based on the request from the gaming machines. The players that have entered the game can employ an insurance function while taking into consideration the profit share of other players.

According to a fourth aspect of the present invention, there is provided a game system having the following configuration. In the game system according to the first aspect, the controller, at the itemized (a), in a case where permission is granted from the plurality of gaming machines to set a predetermined value, stores the predetermined value to be shared among the plurality of gaming machines that granted said permission, in the memory.

According to the fourth aspect of the present invention, the predetermined value is set among the players who are willing to set the predetermined value amongst each other, making it possible to provide a game offering cooperative characteristics among the players.

According to a fifth aspect of the present invention, there is provided a game system having the following configuration. In the game system according to the first aspect, the controller, at the itemized (a), in a case where a request for prohibiting setting of a predetermined value is made from at least one gaming machine from among the plurality of gaming machines, stores the predetermined value to be shared among the plurality of gaming machines, excluding the gaming machine from which the request was made, in the memory.

According to the fifth aspect of the present invention, even if there is (are) a predetermined gaming machine(s), amongst the plurality of gaming machines, at which the predetermined value is not commonly set, the shared predetermined value can be set except for at the predetermined gaming machine(s), allowing for flexible setting of the shared predetermined value.

According to a sixth aspect of the present invention, there is provided a game system having the following configuration. In the game system according to the first aspect, the controller, at the itemized (a), displays a selection request image for prompting selection on whether to share the predetermined value, on the display device.

According to the sixth aspect of the present invention, the selection request image for prompting the player to select whether to share the predetermined value is displayed, allowing setting of the predetermined value based on the players' will.

According to a seventh aspect of the present invention, there is provided a game system having the following configuration. The game system has a plurality of gaming machines capable of communicating with each other via a communication line. The plurality of gaming machines each have: (i) a display device onto which a plurality of types of symbols are arranged; (ii) an input device operable to input an insurance BET; (iii) at least one memory; and (iv) a controller. The controller is configured to: (a) store a predetermined value to be shared among the plurality of gaming machines, in the memory; (b) accept an insurance BET input from the input device; (c) count the insurance BET accepted in an accumulative manner and store a value of the counted the insurance BET in the memory; (d) carry out transmission and reception of insurance BET information stored in the memory with other gaming machines; (e) sum up insurance BET numbers stored in the plurality of gaming machines, based on the insurance BET information received from said other gaming machines, and store the value of the summing-up result in the memory; (f) automatically re-arrange the plurality of types of symbols arranged on the display device; (g) judge whether a predetermined symbol arrangement state is established the display device onto which the symbols are re-arranged; (h) count the predetermined symbol arrangement state as one count, in an accumulative manner, and store the counted value in the memory, if it is judged, as a result of said judgment at the itemized (g), that the predetermined symbol arrangement state is established; (i) carry out transmission and reception of information concerning a number of times for the predetermined symbol arrangement state stored in the memory, with said other gaming machines; (j) sum up the number of times for the predetermined symbol arrangement state of the plurality of gaming machines, based on the information concerning the number of times for the predetermined symbol arrangement state received from said other gaming machines, and store the value of the summing-up result in the memory; (k) judge, as a result of repeating the processing at the itemized (b) to (j), whether the number of times for the predetermined symbol arrangement state, obtained in the summing-up processing at the itemized (j) reaches the predetermined value stored at the itemized (a); and (j) award a prize to at least one gaming machine from the plurality of gaming machines at which the predetermined value was stored at the itemized (a), said prize including the total insurance BET stored at the itemized (e), if it is judged, as a result of said judgment at the itemized (k), that a total number of times for the predetermined symbol arrangement state of the plurality of gaming machines reaches the predetermined value.

According to the seventh aspect of the present invention, judgment on whether the total number of times for the predetermined symbol arrangement state reaches the predetermined value set in advance is made based on the plurality of gaming machines. This reduces the time required to reach the predetermined value, as compared to the case judgment is made based on one gaming machine, making it possible to swiftly award a prize, as an insurance function, to the players. This insurance prize includes the insurance BET which was counted at the plurality of gaming machines in an accumulative manner. Accordingly, the prize is set to a higher payout than that in the case of one gaming machine, allowing the players to employ an insurance function which was not successfully achieved in the conventional art.

According to an eighth aspect of the present invention, there is provided a game system having the following configuration. The game system according to the seventh aspect further includes a central display device capable of communicating with the plurality of gaming machines and operable to display a predetermined common game. The controller, at the itemized (l), if it is judged, as a result of said judgment at the itemized (k), that the total number of times for the predetermined symbol arrangement state of the plurality of gaming machines reaches the predetermined value stored at the itemized (a), displays the common game on the central display device and awards a prize to at least one gaming machine from among the plurality of gaming machines at which the predetermined value was stored at the itemized (a), based on an outcome of the common game that was displayed and executed, said prize including the total insurance BET stored at the itemized (e).

According to the eighth aspect of the present invention, a prize employing the insurance function is awarded based on the outcomes of the common game executed in the plurality of gaming machines, making it possible to award prizes to the players based on equal conditions. The common game is displayed and executed on the central display, making it possible to provide a display which is visually shared by the players.

According to the ninth aspect of the present invention, there is provided a game system having the following configuration. In the game system according to the seventh aspect, the plurality of gaming machines each have: a first table for distributing said prize to the plurality of gaming machines; and a second table for awarding said prize to a predetermined gaming machine. The controller, at the itemized (k), if it is judged, as a result of said judgment at the itemized (j), that the total number of times for the predetermined symbol arrangement state of the plurality of gaming machines reaches the predetermined value stored at the itemized (a), selectively switches between the first table and the second table, based on a request from at least one gaming machine from the plurality of gaming machines; and awards a prize to at least one gaming machine from among the plurality of gaming machines at which the predetermined value was stored at the itemized (a), based on a table that was selectively switched, said prize including the total insurance BET stored at the itemized (e).

According to the ninth aspect of the present invention, a prize employing the insurance function can be awarded only to the specific gaming machine or can be awarded by distribution to the plurality of gaming machines, based on a request from the gaming machine. The players that have entered the game can employ an insurance function while taking into consideration the profit share of other players.

According to a tenth aspect of the present invention, there is provided a gaming machine having the following configuration. In the gaming machine according to the seventh aspect, the controller, at the itemized (a), in a case where permission is granted from the plurality of gaming machines to set a predetermined value, stores the predetermined value to be shared among the plurality of gaming machines from which said permission was granted, in the memory.

According to the tenth aspect of the present invention, the predetermined value is set among the players who are willing to set the predetermined value amongst each other, making it possible to provide a game offering cooperative characteristics among the players.

According to an eleventh aspect of the present invention, there is provided a game system having the following configuration. In the game system according to the seventh aspect, the controller, at the itemized (a), in a case where a request for prohibiting setting of a predetermined value is made from at least one gaming machine from among the plurality of gaming machines, stores the predetermined value to be shared among the plurality of gaming machines, excluding the gaming machine from which said request was made, in the memory.

According to the eleventh aspect of the present invention, even if there is (are) a predetermined gaming machine(s), amongst the plurality of gaming machines, at which the predetermined value is not commonly set, the shared predetermined value can be set except for at the predetermined gaming machine(s), allowing for flexible setting of the shared predetermined value.

According to a twelfth aspect of the present invention, there is provided a game system having the following configuration. In the game system according to the seventh aspect, the controller, at the itemized (a), displays a selection request image for prompting selection of whether to share the predetermined value, on the display device.

According to the twelfth aspect of the present invention, the selection request image for prompting the player to select whether to share the predetermined value is displayed, allowing setting of the predetermined value based on the players' will.

According to the thirteenth aspect of the present invention, there is provided a game system having the following configuration. The game system has: (a) a plurality of gaming machines capable of communicating with each other via a communication line, the plurality of gaming machines each having: a display device onto which a plurality of types of symbols are arranged; an input device operable to input an insurance BET; and at least one memory; and (b) a central controller capable of communicating with the plurality of gaming machines. The plurality of gaming machines is configured to processing (a-1) to (a-6), and the central controller is configured to processing (b-1) to (b-5) as follows: (b-1) the central controller sets a predetermined value to be shared among the plurality of gaming machines; (a-1) the plurality of gaming machines accept an insurance BET input from the input device; (a-2) the plurality of gaming machines count the insurance BET accepted in an accumulative manner and store a value of the counted insurance BET in the memory; (a-3) the plurality of gaming machines transmit the insurance BET information stored in the memory to the central controller; (b-2) the central controller sums up the insurance BET numbers of the plurality of gaming machines, based on the insurance BET information received from the plurality of gaming machines; (a-4) the plurality of gaming machines automatically re-arrange the plurality of types of symbols arranged on the display device; (a-5) the plurality of gaming machines count the number of times for a game on a one-game basis, in an accumulative manner, and store a value of the counted number of times in the memory; (a-6) the plurality of gaming machines transmit information on the number of times for the game stored in the memory, to the central controller; (b-3) the central controller sums up the number of times for the game in the plurality of gaming machines, based on information concerning the number of times for the game received from the plurality of gaming machines; (b-4) the central controller judges, as a result of the plurality of gaming machines repeating the processing at the itemized (a-1) to (a-6), that the total number of times for the game, resulting from the summing-up processing at the itemized (b-3), reaches the predetermined value set at the itemized (b-1); and (b-5) the central controller transmits information for awarding a prize to at least one gaming machine from among the plurality of gaming machines, said prize including the total insurance BET resulting from the summing-up processing at the itemized (b-2), if it is judged, as a result of said judgment at the itemized (b-4), that the total number of times for game reaches the predetermined value set at the itemized (b-1).

According to the thirteenth aspect of the present invention, judgment on whether the total number of times for the game reaches the predetermined value set in advance is made based on the plurality of gaming machines. This will reduce the time required to reach the predetermined value, as compared to the case judgment is made based on one gaming machine, making it possible to swiftly award a prize, as an insurance function, to the players. This insurance prize includes the insurance BET which was counted at the plurality of gaming machines in an accumulative manner. Accordingly, the prize is set to a higher payout than that in the case of one gaming machine, offering to the players payouts employing an insurance function which was not successfully achieved in the conventional art. The central controller and the gaming machines communicate with each other to execute a game. The gaming machines can thus all be managed at the central controller side, preventing fraudulent acts and the like.

According to the fourteenth aspect of the present invention, there is provided a game system having the following configuration. The game system according to the thirteenth aspect further includes a central display device capable of communicating with the central controller, and operable to display a predetermined common game. The central controller, at the itemized (b-5), in a case where it is judged, as a result of said judgment at the itemized (b-4), that the total number of times for the game reaches the predetermined value at the itemized (b-1), displays the common game on the central display device, and transmits information concerning the award of a prize to at least one gaming machine from among the plurality of gaming machines, based on an outcome of the common game that was displayed and executed, said prize including the total insurance BET of the summing-up result at the itemized (b-2).

According to the fourteenth aspect of the present invention, a prize employing the insurance function is awarded based on the outcomes of the common game executed in the plurality of gaming machines, making it possible to award prizes to the players based on equal conditions. The common game is displayed and executed on the central display, making it possible to provide a display which is visually shared by the players.

According to the fifteenth aspect of the present invention, there is provided a game system having the following configuration. In the game system according to the thirteenth aspect, the central controller has: a first table for distributing said prize to the plurality of gaming machines; and a second table for awarding said prize to a predetermined gaming machine. The central controller, at the itemized (b-5), if it is judged, as a result of said judgment at the itemized (b-4), that the total number of times for the game reaches the predetermined value set at the itemized (b-1), selectively switches between the first table and the second table based on a request from at least one gaming machine from among the plurality of gaming machines, and transmits information for awarding a prize to at least one gaming machine from among the plurality of gaming machines, based on the table that was selectively switched, said prize including the total insurance BET of the summing-up result at the itemized (b-2).

According to the fifteenth aspect of the present invention, a prize employing the insurance function can be awarded only to the specific gaming machine, or can be awarded by distribution to the plurality of gaming machines, based on a request from the gaming machine. The players that have entered the game can employ an insurance function while taking into consideration the profit share of other players.

According to a sixteenth aspect of the present invention, there is provided a game system having the following configuration. In the game system according to the thirteenth aspect, the central controller, at the itemized (b-1), in a case where permission is granted from the plurality of gaming machines to set a predetermined value, sets the predetermined value to be shared among the plurality of gaming machines that granted said permission.

According to the sixteenth aspect of the present invention, the predetermined value is set among the players who are willing to set the predetermined value amongst each other, making it possible to provide a game offering cooperative characteristics among the players.

According to the seventeenth aspect of the present invention, there is provided a game system having the following configuration. In the game system according to the thirteenth aspect, the central controller, at the itemized (b-1), in a case where a request for prohibiting setting a predetermined value is made from at least one gaming machine from among the plurality of gaming machines, sets the predetermined value to be shared among the plurality of gaming machines, excluding the gaming machine from which said request was made.

According to the seventeenth aspect of the present invention, even if there is (are) a predetermined gaming machine(s), amongst the plurality of gaming machines, at which the predetermined value is not commonly set, the shared predetermined value can be set except for at the predetermined gaming machine(s), allowing for flexible setting of the shared predetermined value.

According to the eighteenth aspect of the present invention, there is provided a game system having the following configuration. In the game system according to the thirteenth aspect, prior to the processing at the itemized (b-1), the plurality of slot machines display on the display device a selection request image for prompting selection of whether to share the predetermined value.

According to the eighteenth aspect of the present invention, the selection request image for prompting the player to select whether to share the predetermined value is displayed, allowing setting of the predetermined value based on the players' will.

According to the present invention, it is possible to provide a game system and a controlling method thereof in which an insurance function is shared among a plurality of gaming machines, making it possible to additionally offer new entertainability to the players.

BRIEF DESCRIPTION OF THE DRAWINGS

FIG. 4 is a view for explaining a symbol arrangement table;

FIG. 5 is a view for explaining a scatter prize award table;

DESCRIPTION OF THE PREFERRED EMBODIMENTS

Figure 1:
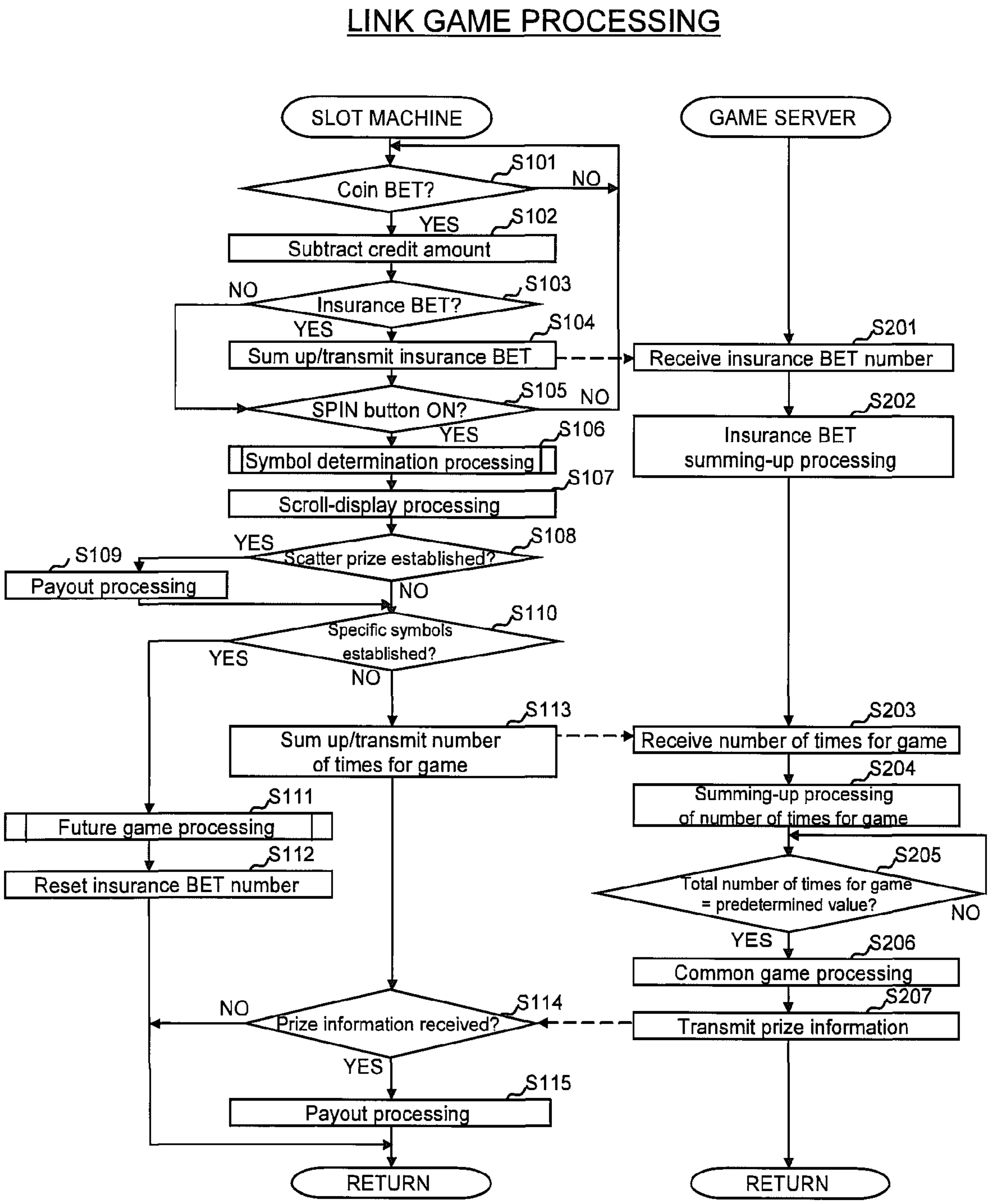
FIG. 1 is a flowchart showing a subroutine of Link game processing.

Hereinafter, one embodiment of a game system and a controlling method thereof, according to the present invention, will be described with referring to the drawings.

When a player makes a request to enter a Link game, a game system 100 according to the present embodiment establishes a communication connection between a plurality of slot machines 10 and a game server 200 to start Link game processing, as shown in FIG. 1.

The Link game is a game in which a player is saved if he/she cannot win a future game even after playing a game by a predetermined number of times. In this game, a predetermined number of times for a game which was set in advance (for instance, 100 times) is consumed at all the slot machines that have entered the game to execute a common game, and the players at the respective slot machines compete for a coin payout corresponding to a total sum value of the insurance BET number which has been accumulated on a game-by-game basis, as insurance.

Figure 8:
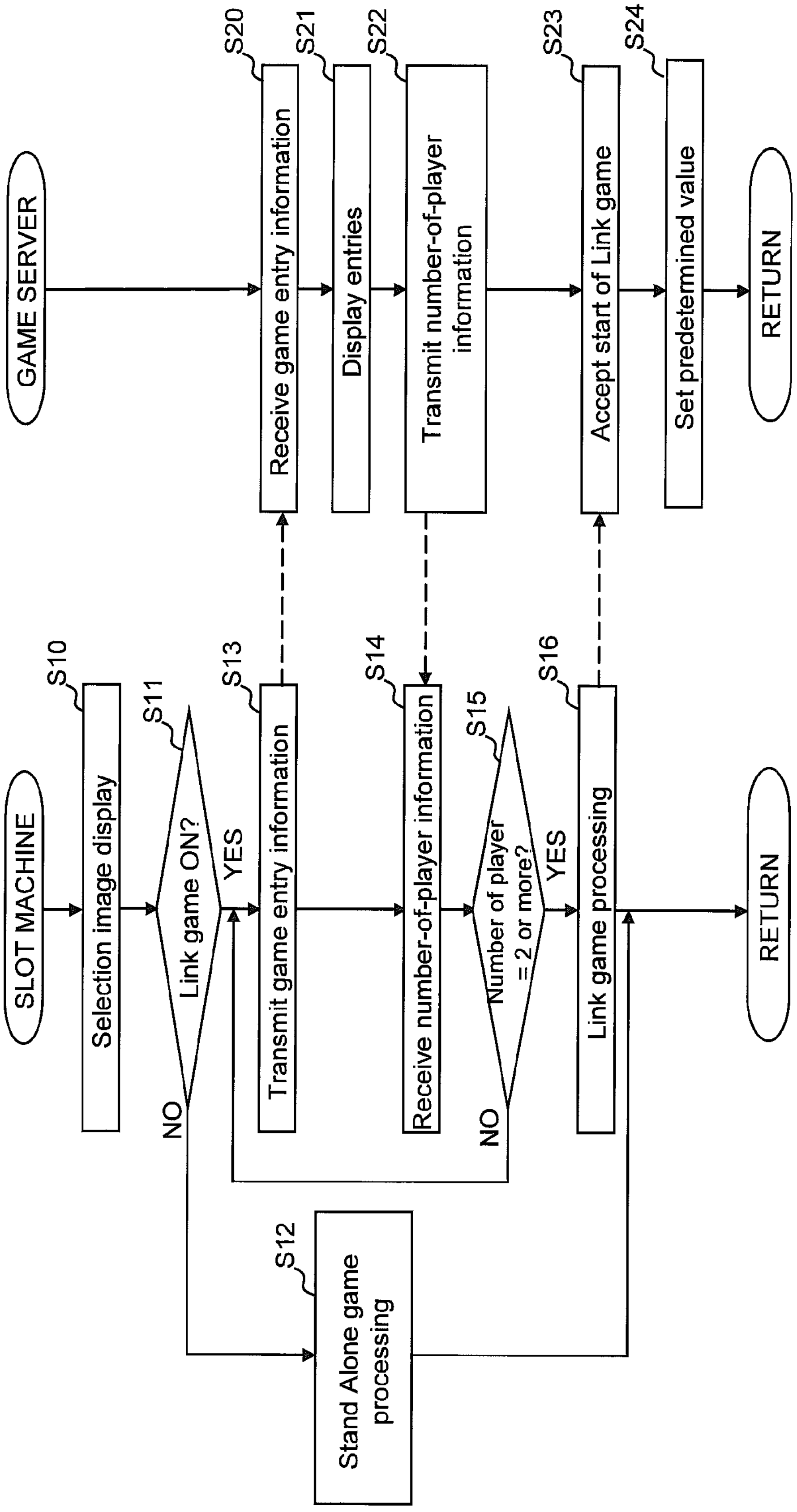
FIG. 8 is a flowchart showing a subroutine of game selection processing.

A CPU 201 of the game server 200 accepts information concerning entry to the Link game, from each slot machine 10 and at the same time, sets a predetermined number of times for the game (for instance, 100 times) to be shared among all the slot machines 10 that have entered the Link game (step S24 in FIG. 8).

The main CPU 41 provided in each of the plurality of slot machines 10 performs the following processing as shown in FIG. 1. Aside from accepting a BET for a game start, the main CPU 41 also accepts an insurance BET, as insurance, input by depression of an INSURANCE BET button 90 (step S103). The main CPU 41 counts the accepted insurance BET in an accumulative manner and then stores the counted value in the RAM 43. The information of the thus counted insurance BET is transmitted to the game server 200 (step S104).

The CPU 201 of the game server 200 performs the following processing as shown in FIG. 1. The CPU 201 receives the insurance BET information transmitted from each slot machine 10 (step S201), and at the same time, sums up the insurance BET number of the plurality of slot machines 10 based on the items of insurance BET information thus received (step S202).

The main CPU 41 in each of the plurality of slot machines 10 carries out the following processing. The main CPU 41 automatically rearranges a plurality of types of symbols arranged on display blocks 28 in a lower image display panel 16 (step S107). Then, the main CPU 41 counts the number of times for the game on a game basis in an accumulative manner, and at the same time, the information concerning the counted number of times for the game is transmitted to the game server 200 (step S113).

The CPU 201 of the game server 200 performs the following processing. The CPU 201 receives the information concerning the number of times for the game transmitted from the slot machines 10 (step S203), and at the same time, sums up the number of times for the game carried out in the slot machines 10 based on the items of information concerning the number of times for the game thus received (step S204). The CPU 201 judges whether the resulting total number of times for the game reaches the predetermined number of times for the game (for instance, 100) set in advance (step S205). In a case where it is judged that the total number of times for the game reaches the predetermined number of times for the game, a common game which is common among the plurality of slot machines 10 is executed, for instance, on a common display 300 (step S206). Then, the CPU 201 transmits prize information based on an outcome of the common game thus executed to the slot machine 10 and at the same time, sets a flag for reset processing to ON, after which it resets the predetermined number of times for the game which was set in advance (100) to "0". The prize information represents information concerning awarding a prize, inclusive of a total insurance BET number (for instance, 1150) stored in the RAM 203 at step S202. In the common game, a free game is carried out by a predetermined number of times among the plurality of slot machines 10, and a prize is awarded to the slot machine 10 at which the number of times for the BONUS win has first reached a predetermined number of times for a win (for instance, 50 times) stored in the RAM 43.

The main CPU 41 of the slot machine 10 executes a payout of a predetermined number of coins corresponding to the total insurance BET value resulting from the summing-up processing at step S202, based on the prize information received from the game server 200.

Figure 2:
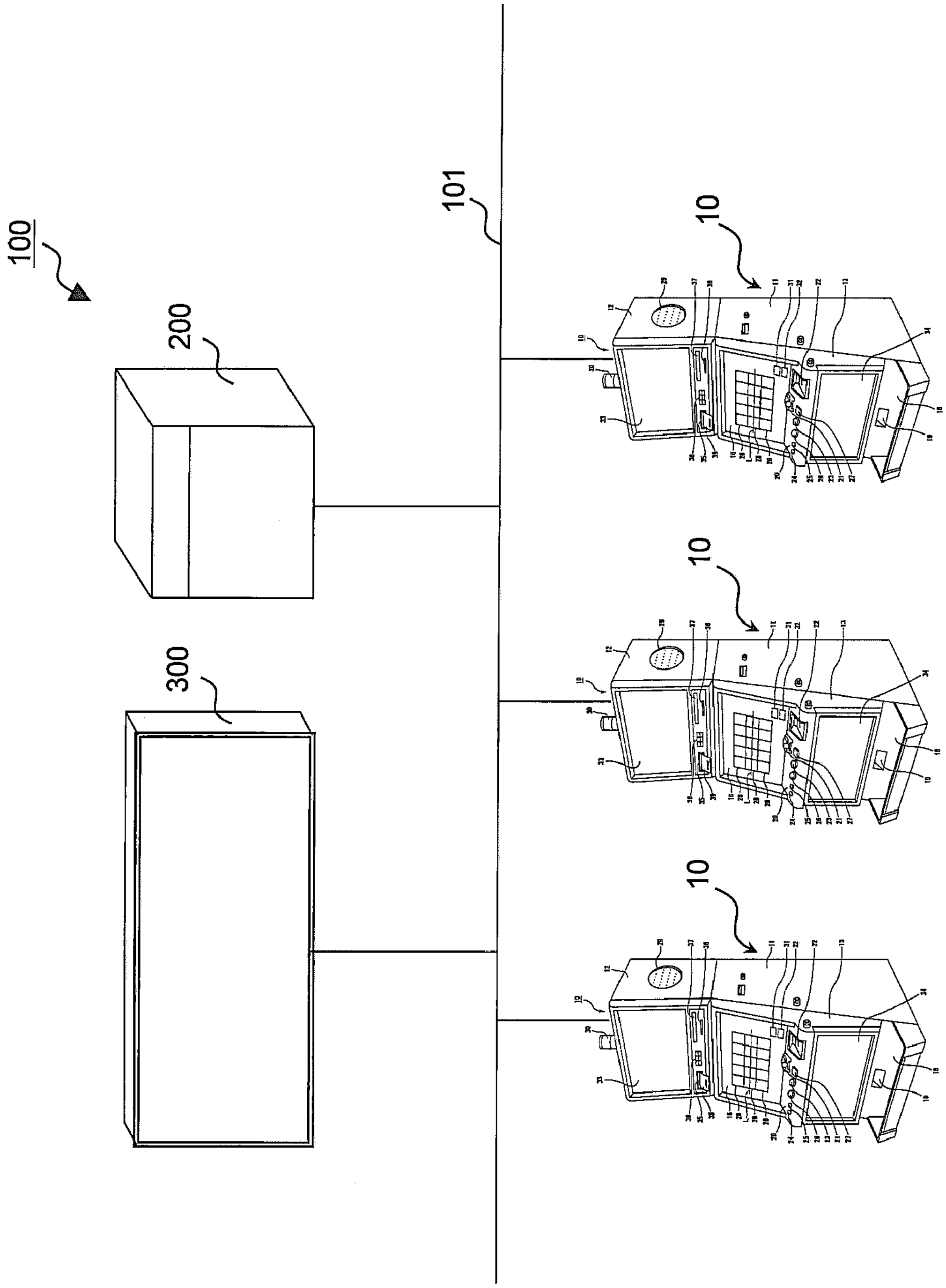
FIG. 2 is a schematic view showing an overall configuration of a game system.

Next, an overall configuration of the game system 100 according to the present embodiment will be described. FIG. 2 is a schematic view showing the overall configuration of the game system. As shown in FIG. 2, the game system 100 has a plurality of slot machines 10, a game server 200, and a common display 300. The common display corresponds to a central display according to the present invention.

The plurality of slot machines 10 and the common display 300 are connected to the game server 200 via a communication line 101. The slot machines 10 and the common display 300 can carry out data transmission and reception with the game server 200 via the communication line 101. The slot machines 10 are connected to each other so as to enable communication therebetween via the communication line 101.

The common display 300 is intended to display a common game which is played among the plurality of slot machines 10 when the Link game to be described later has been executed. The common display is installed at a position where it can be seen by the players at the slot machines 10.

In the present embodiment, a description will be given as to the case that the plurality of slot machines 10, the game server 200 and the common display 300 are connected in a wired fashion. However, the present invention is not limitative to this example, and data transmission and reception therebetween may also be carried out wirelessly. That is, the communication line according to the present invention includes a wired, as well as a wireless transmission path. In the present embodiment, a description will be given as to the case that the game system 100 is installed in one gaming arcade, etc. However, in the present invention, each slot machine 10 may be installed in separate gaming arcades.

Figure 3:
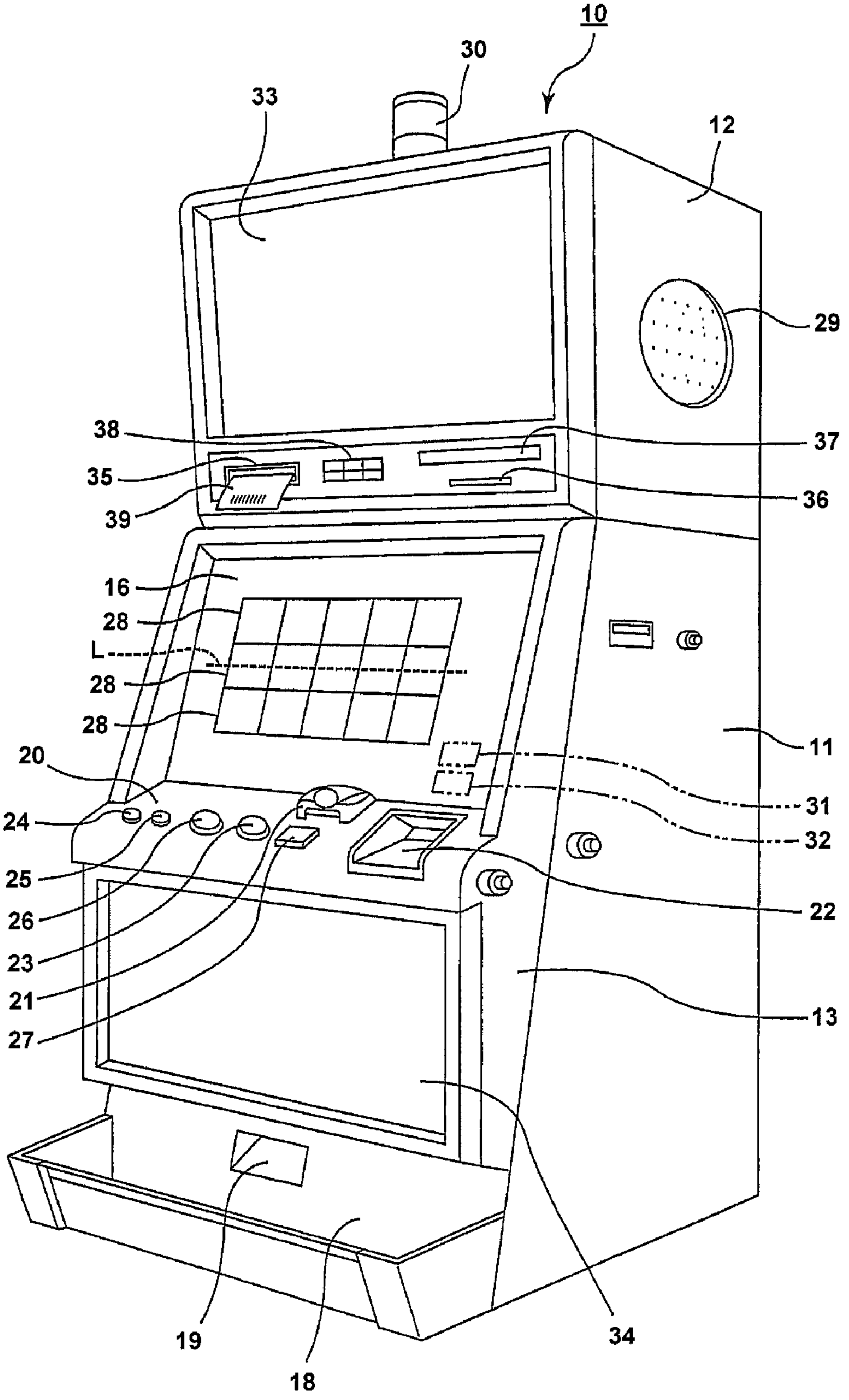
FIG. 3 is a perspective view showing an appearance of a slot machine.

Next, the configuration of each sot machine 10 according to the present embodiment will be described using FIG. 3. The slot machine to be described here is a video-type slot machine, but the present invention is also applicable to a mechanical reel-type slot machine.

Generally, a slot machine 10 executes a Stand-Alone game in which it operates independently from the other slot machines 10. In accordance with a selection request from the player, the slot machine 10 also executes a Link game in cooperation with the other slot machines 10, via the game server 200.

In the slot machine 10, coins, bills or electronic valid information equivalent thereto are employed as gaming media. In the present invention, however, the gaming media are not limitative thereto in particular, and can include medals, tokens, electric money, and tickets, for example. The above tickets are not limitative thereto in particular, and can include bar code-attached tickets or the like, as described later, for example.

The slot machine 10 is provided with: a cabinet 11; a top box 12 installed at the upper side of the cabinet 11; and a main door 13 provided at the front face of the cabinet 11.

In front of the main door 13, a lower image display panel 16 is provided as a display device. The lower image display panel 16 is provided with a transparent liquid crystal display panel, and 15 display blocks 28 (28*a* to 28*o*) of 5 columns and 3 rows are displayed. One symbol is displayed in each of the display blocks 28. The lower image display panel 16 is equivalent to the display device according to the present invention.

In addition, a credit amount display portion 31 and a payout number display portion 32 are set on the lower image display panel 16. At the credit amount display portion 31, the number of credited coins is displayed by way of image. At the payout display portion 32, the number of coins paid out in a case where symbols of the same type are displayed in a stopped state by a predetermined number or more in the display blocks 28, is displayed by way of image.

Further, on the front face of the lower image display panel 16, a touch panel 69 is provided, so that a player can enter various instructions by operating the touch panel 69.

Provided downwardly of the lower image display panel 16 are: a control panel 20 made of a plurality of buttons 23 to 27 for a player to input instructions associated with the progress of a game; a coin insertion slot 21 for accepting coins in the cabinet 11; and a bill validator 22.

On the control panel 20, a SPIN button 23, a CHANGE button 24, a CASHOUT button 25, a 1-BET button 26, a MAX-BET button 27 and an INSURANCE BET button 90 are provided. The SPIN button 23 is intended to enter an instruction for starting scroll-display of symbols. The CHANGE button 24 is employed when a player requests the attendant in game facility to change money. The CASHOUT button 25 is intended to enter an instruction for paying out credited coins to a coin tray 18.

The 1-BET button 26 is intended to enter an instruction for betting one coin on a game from among the credited coins. The MAX-BET button 27 is intended to enter an instruction for betting the maximum number of coins (50 coins in the present embodiment) that can be betted in one game. The 1-BET button 26 and the MAX-BET button 27 are equivalent to the BET button for the game start.

The INSURANCE BET button 90 is intended to enter an instruction for betting a predetermined number of coins (for instance, 10 coins) as insurance, from among the credited coins. The insurance bet placed with the use of the INSURANCE BET button 90 is randomly placed by the player, unlike the BET buttons 26 and 27 for the game start. In the Stand-Alone game, in a case where the number of times for the game has reached a predetermined value (for instance, 100 times), a predetermined number of coins (for instance 150 coins) corresponding to the insurance BET number invested on a game-by-game basis are paid out as insurance. In the Link game, in a case where the total number of times for the game in all the slot machines 10 that have entered the Link game has reached a shared predetermined value (for instance, 100 times), a predetermined number of coins (for instance, 2000 coins) corresponding to a total sum of the insurance BET number invested on a game-by-game basis in each slot machine 10 are paid out, as insurance, to a predetermined slot machine 10 based on a result of the common game. The INSURANCE BET button 90 corresponds to an input device according to the preset invention.

The insertion of gaming media denotes that gaming media are betted on games. For example, in a case where the coins inserted into the coin insertion slot 21 are directly betted on games, coin insertion into the coin insertion slot 21 is equivalent to insertion of gaming media. Specifically, if coins are inserted into the coin insertion slot 21, they are temporarily credited. When the 1-BET button 26 and the MAX-BET button 27 are operated, the credited coins are betted on games. In this case, the fact that the credited coins are betted on games is equivalent to insertion of gaming media.

The bill validator 22 validates whether or not bills are valid and accepts valid bills in the cabinet 11. The bill validator 22 may be constructed so that bar code-attached tickets 39 described later are readable thereby. Provided on the lower front face of the main door 13, i.e., downwardly of the control panel 20 is a belly glass 34 on which a character or the like of the slot machine 10 is expressed.

An upper image display panel 33 is provided on the front face of the top box 12. The upper image display panel 33 is provided with a liquid crystal display panel, and displays images representative of an introduction to the contents of a game or explanation of game rules. In addition, the upper image display panel 33 displays effect images when a future game or a progressive jackpot is established.

In addition, a speaker 29 is provided at the top box 12. At the lower side of the upper image display panel 33, a ticket printer 35, a card reader 36, a data display 37, and a keypad 38 are provided. The ticket printer 35 prints, on tickets, bar codes having coded therein a variety of data including credit number, date and time, and identification number of slot machine 10. The printed tickets are output as bar code-attached tickets 39. A player causes another slot machine to read the bar code-attached tickets 39, allowing the slot machine to perform games, or alternatively, allowing the exchange of bar code-attached tickets 39 with bills or the like at a predetermined site of a game facility (for example, at the cashier in a casino).

The card reader 36 is intended to read and write data from/into a smart card. The smart card is a player-owned card, and stores data for recognizing the player and data concerning the log of games that were performed by the player. The smart card may store data equivalent to coins, bills, or credits. In addition, a magnetic stripe card may be employed in place of the smart card. A data display 37 is made up of a fluorescent display or the like, and displays the data read by the card reader 36 and the data input by the player via the keypad 38, for example. The keypad 38 is intended to input the instructions and data concerning the issuance of tickets or the like.

FIG. 4 is a view for explaining a symbol arrangement table. As shown in FIG. 4, in display blocks 28, the columns of a total of 22 symbols made up of code numbers 00 to 21 are displayed in a scrolled manner. The column of symbols is constituted while symbols "EARTH", "JUPITER", "SATURN", "SUN", "VENUS", "MARS", "MERCURY", "K", "J", "Q", and "A" are combined with each other. These symbols are all scatter symbols.

FIG. 5 is a view for explaining a scatter prize. The symbols "JUPITER", "SATURN", "SUN", "VENUS", "MARS", "MERCURY", "K", "J", "Q", and "A" are trigger symbols for the scatter prize. Among these symbols, in a case where three or more symbols of the same type are displayed (rearranged) in a stopped state in any of the display blocks 28 of the lower image display panel 16, a predetermined number of coins are paid out as the scatter prize corresponding to the types and number of symbols and BET number. The payout of coins is performed based upon FIG. 5. For example, if three "JUPITER" symbols are displayed in a stopped state in any of the display blocks 28, 70 coins are paid out; if four "JUPITER" symbols are displayed in a stopped state, 140 coins are paid out; and if five "JUPITER" symbols are displayed in a stopped state, 280 coins are paid out (these coin payout numbers are calculated for one coin entry).

Hereinafter, the "EARTH" symbol will be described. "EARTH" is a trigger symbol for BONUS. If tree or more "EARTH" symbols are displayed (re-arranged) in a stopped state in any of the display blocks 28 of the lower image display panel 16, a BONUS win is established ("BONUS IN" is set), and a future game is executed.

In the future game, a free game is executed by a predetermined number of times that was determined based upon the random number value obtained by executing a random number generation program included in the symbol determination programs. The free game is a game which the player can perform without betting coins.

Figure 6:
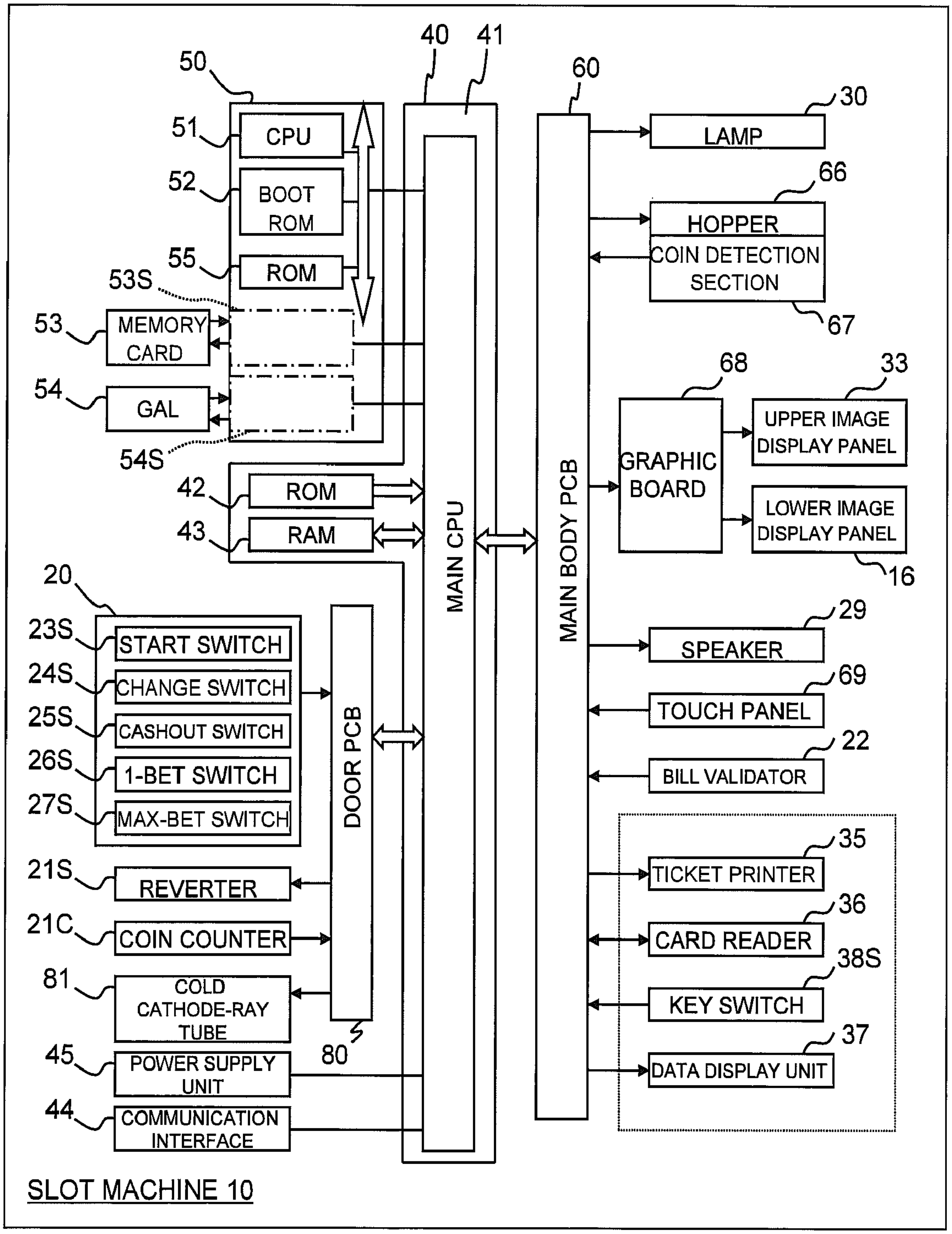
FIG. 6 is a block diagram depicting an internal configuration of the slot machine.

FIG. 6 is a block diagram depicting an internal configuration of a slot machine. A gaming board 50 is provided with: a CPU (Central Processing Unit) 51, a ROM55, and a boot ROM52, which are interconnected via an internal bus; a card slot 53S compatible with a memory card 53; and an IC socket 54S compatible with a GAL (Generic Array Logic) 54.

The memory card 53 is made up of non-volatile memories such as CompactFlash (registered trademark), and stores game programs. The game programs contain a symbol determination program. The symbol determination program is intended for determining symbols (code Nos. corresponding to the symbols shown in FIG. 4) which are displayed in a stopped state along the payline L.

The card slot 53S is constituted such that the memory card 53 can be inserted into or drawn out from, and is connected to a motherboard 40 through an IDE bus. Therefore, the types or contents of games played in the slot machine 10 can be changed by removing the memory card 53 from the card slot 53S, writing different game programs into the memory card 53, and then, inserting the memory card 53 into the card slot 53S. The game programs include those related to the progress of a game. The game programs further include: image data and sound data output at the time of the play of a game.

The CPU51, the ROM55, and the boot ROM52 interconnected via the internal bus are connected to the motherboard 40 via a PCI bus. The PCI bus not only performs signal transmission between the motherboard 40 and the gaming board 50, but also supplies power from the motherboard 40 to the gaming board 50.

The motherboard 40 is made up of a commercially available general-purpose motherboard (a printed circuit board on which the essential parts of a personal computer are mounted). This motherboard includes: a main CPU 41; a ROM (Read Only Memory) 42; a RAM (Random Access Memory) 43; and a communication interface 44. The main CPU 41 functions as the controller of the present invention. The RAM 43 is equivalent to the memory according to the present invention.

The ROM 42 is made up of a memory device such as a flash memory, and stores a program such as a BIOS (Basic Input/Output System) executed by the main CPU 41 and permanent data. When the main CPU 41 executes the BIOS, initialization processing is performed for predetermined peripheral devices, and capture processing of the game program stored on the memory card 53 is also started via the gaming board 50. In the present invention, the contents of the ROM 42 may be rewritable or not. In the present embodiment, the ROM 42 stores the symbol arrangement table shown in FIG. 4 and the scatter prize award table shown in FIG. 5, for instance.

The RAM 43 stores data and programs employed when the main CPU 41 is activated. In addition, the RAM 43 can store game programs. In the present embodiment, the RAM 43 stores, for instance, the insurance BET number, the BET number for game start, the number of times for the BONUS win, the progressive value, the number of symbols, the number of credits, coin entry number and payout number in one game, and data received from the game server 200. The RAM 43 also stores a predetermined value (for instance, 100 times), representing an accumulated value of the number of times for the game.

Both a body PCB (Printed Circuit Board) 60 and a door PCB 80, which will be described later, are connected to the motherboard 40 by the USB. Further, a power source unit 45 and a communication interface 44 are also connected to the motherboard 40.

Equipment and devices, which generate input signals to be input to the main CPU 41, and equipment and devices, the operations of which are controlled by a control signal output from the main CPU 41, are connected to the body PCB 60 and the door PCB 80. The main CPU 41 executes the game programs stored in RAM 43, based upon an input signal that was input to the main CPU 41, thereby performing predetermined computational processing. Then, this CPU 41 stores outcomes of the processing into RAM 43; and transmits control signals to equipment and devices as control processing relative to the equipment and devices.

A lamp 30, a hopper 66, a coin detecting section 67, a graphic board 68, a speaker 29, a touch panel 69, a bill validator 22, a ticket printer 35, a card reader 36, a key switch 38S and a data display 37, are connected to the body PCB 60. The lamp 30 is lit up in a predetermined pattern, based upon a control signal output from the main CPU 41.

The hopper 66 is installed in the cabinet 11. This hopper pays out a predetermined number of coins from a coin payout exit 19 to a coin tray 18, based upon a control signal output from the main CPU 41. A coin detecting section 67 is installed inside the coin payout exit 19. This detecting section outputs an input signal to the main CPU 41 at the time of detecting that a predetermined number of coins have been paid out from the coin payout exit 19.

The graphic board 68 performs control, based upon a control signal output from the main CPU 41. This graphic board displays images on the upper image display panel 33 and the lower image display panel 16 that serves as an output device. The activated paylines randomly determined through selection of random numbers are displayed, and also, symbols determined through selection of random number are displayed in a scrolled or stopped state, in the respective display blocks 28 on the lower image display panel 16. The number-of-credits display section 31 on the lower image display panel 16 displays the number of credits stored in the RAM 43. Further, the number-of-payouts display section 32 on the lower image display panel 16 displays the number of coins to be paid out. The graphic board 68 is equipped with: a VDP (Video Display Processor), which generates image data based upon a control signal output from the main CPU 41; and a video RAM, which temporarily stores image data generated by the VDP or the like. The image data used in generating image data with VDP is read from the memory card 53. The read image data is contained in the game programs stored in the RAM 43.

The bill validator 22 not only discriminates a valid bill from an invalid bill, but also accepts the valid bill into the cabinet 11. At the time of accepting a valid bill, the bill validator 22 outputs an input signal to the main CPU 41 based upon a face amount of the bill. The main CPU 41 stores the number of credits corresponding to the face amount of the bill transmitted with the input signal in the RAM 43.

The ticket printer 35, based upon a control signal output from the main CPU 41, prints on a ticket a bar code obtained by encoding data such as the number of credits, date and time, and the identification number of the slot machine 10 stored in the RAM 43. The printed bar-code ticket is output as the bar code-attached ticket 39. The card reader 36 transmits, to the main CPU 41, the data read from the smart card, and writes the read data onto the smart card, based upon a control signal from the main CPU 41. The key switch 38S is provided on the key pad 38, and outputs a predetermined input signal to the main CPU 41 when a player operates the key pad 38. The data display 37 displays, based upon a control signal output from the main CPU 41, the data read by the card reader 36 and the data input by a player through the key pad 38.

The control panel 20, a reverter 21S, a coin counter 21C, and a cold cathode-ray tube 81 are connected to the door PCB 80. The control panel 20 is provided with: a SPIN switch 23S corresponding to the SPIN button 23; a CHANGE switch 24S corresponding to the CHANGE button 24; a CASHOUT switch 25S corresponding to the CASHOUT button 25; a 1-BET switch 26S corresponding to the 1-BET button 26; a MAX-BET switch 27S corresponding to the MAX-BET button 27 and an INSURANCE BET switch 90S corresponding to the INSURANCE BET button 90. When a player operates the buttons 23 to 27, the switches 23S to 27S corresponding thereto output input-signals to the main CPU 41, respectively.

The coin counter 21C is installed inside the coin receiving slot 21. This coin counter discriminates whether a coin inserted by a player into the coin receiving slot 21 is valid or invalid. Those other than the valid coins are discharged from the coin payout exit 19. The coin counter 21C also outputs an input signal to the main CPU 41 if a valid coin is detected.

The reverter 21S operates based upon a control signal output from the main CPU 41 and distributes valid coins recognized by the coin counter 21C into a cash box (not shown) or the hopper 66, which is disposed in the slot machine 10. In other words, when the hopper 66 is filled with coins, valid coins are distributed into the cash box. On the other hand, when the hopper 66 is not filled with coins, valid coins are distributed into the hopper 66. The cold cathode-ray tube 81 works as a backlight installed on the back face side of each of the lower image display panel 16 and the upper image display panel 33. This backlight is lit up based upon a control signal output from the main CPU 41.

Figure 7:
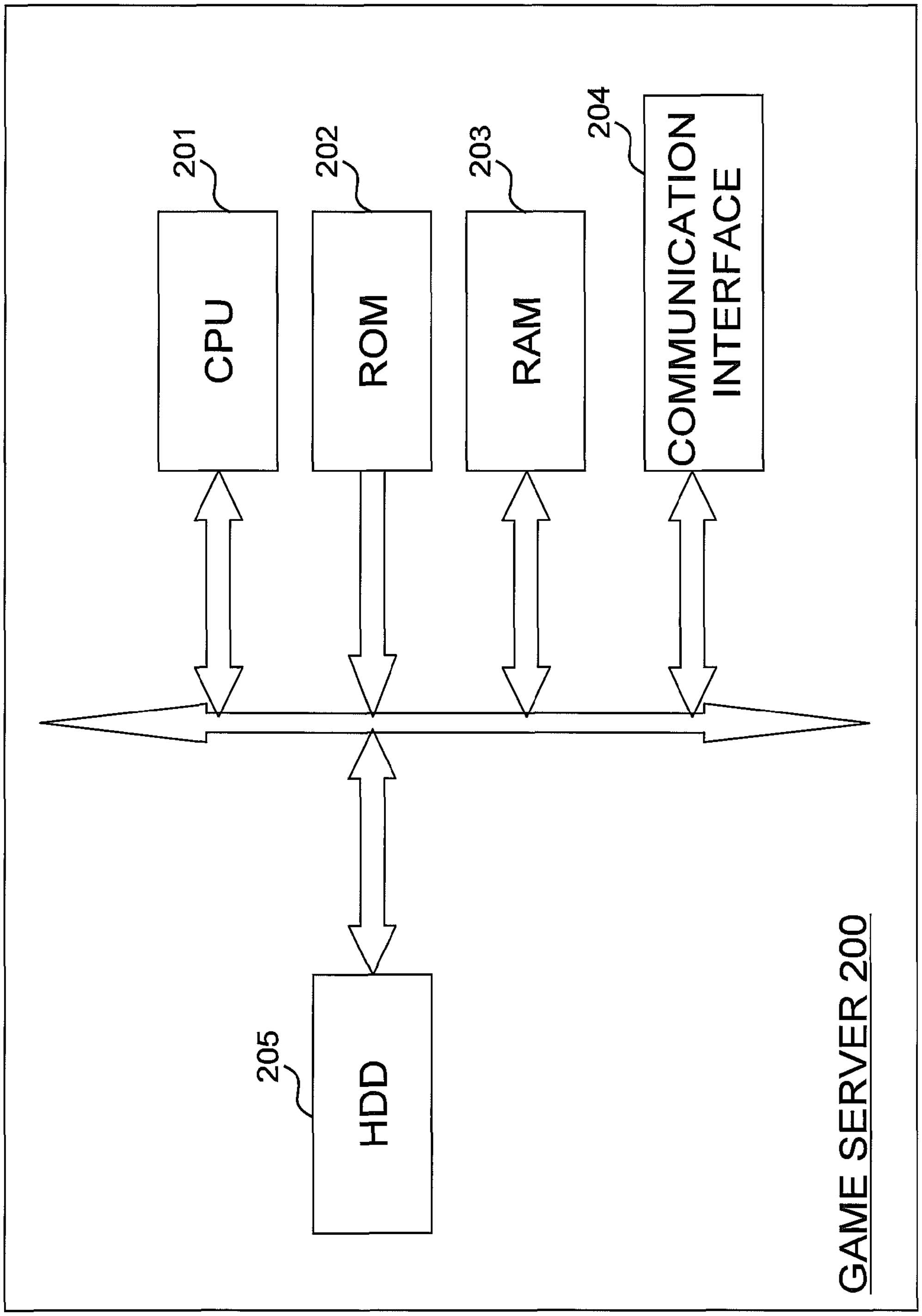
FIG. 7 is a block diagram depicting an internal configuration of a game server.

FIG. 7 is a block diagram showing an internal configuration of the game server. As shown in FIG. 7 the game server has a CPU 201, a ROM 202, a RAM 203, a communication interface 204 and an HDD (Hard Disk Drive) 205, as a memory. The communication interface 204 is connected to the common display 300 and the communication interface 44 for each slot machine 10 via the communication line 101. The ROM 202 stores a system program for controlling the operation of the CPU 201 and permanent data. The RAM 203 temporarily stores data received from each slot machine 10. The HDD 205 collects, in a cumulative manner, the gaming media on which the insurance BET was placed in the slot machines 10 and at the same time, stores information concerning the number of players in the Link game, payment information concerning the gaming media and information concerning the common game. The CPU 201 corresponds to a central controller according to the present invention.

Next, processing carried out in the game system 100 will be described with referring to the drawings. The main CPU 41 of the slot machine 10 advances the game by reading and then executing a game program. The CPU 201 of the game server 200 controls the overall game system 100 by reading and executing a predetermined program.

Figure 9A:
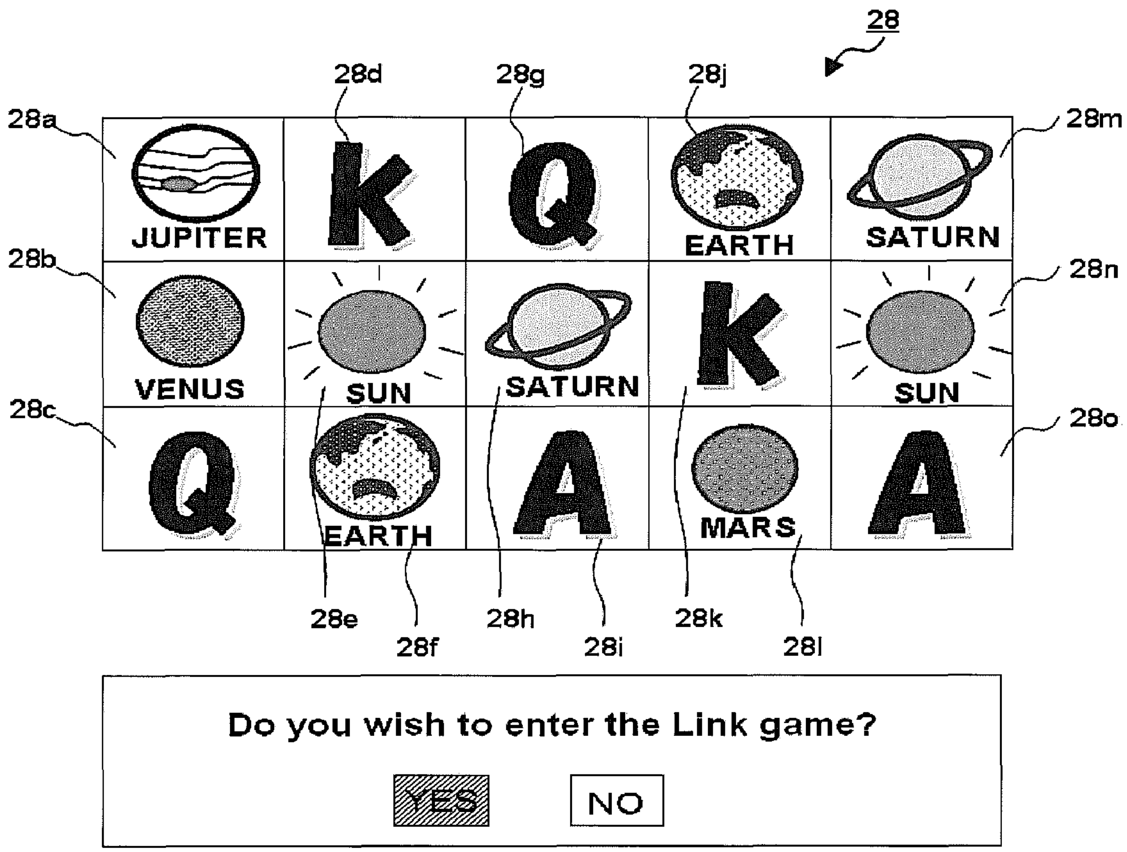
FIG. 9A is a view showing an exemplary display on a display.
Figure 9B:
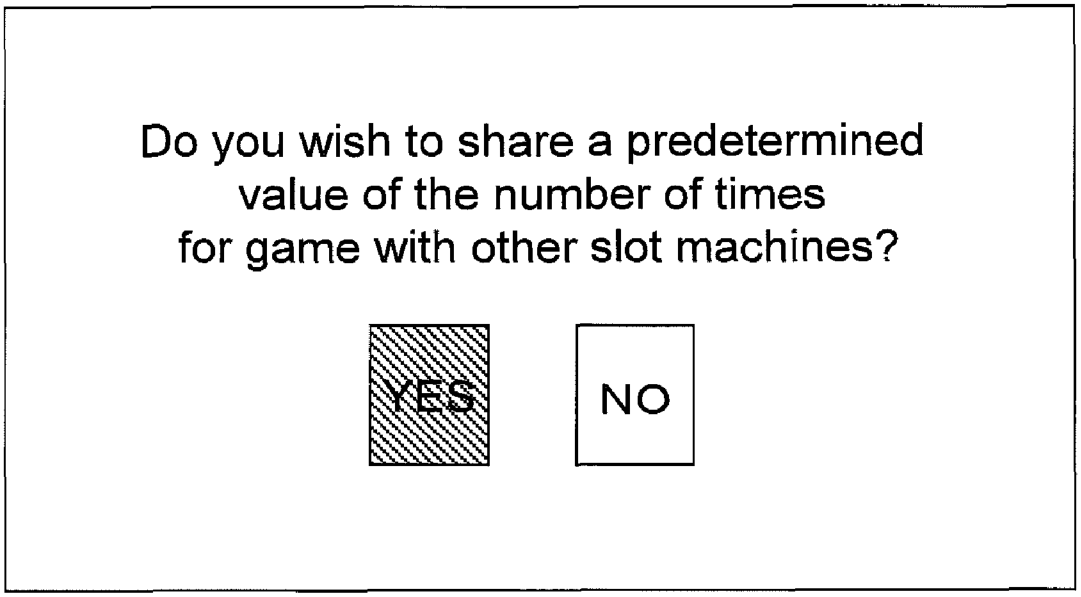
FIG. 9B is a view showing an exemplary display on the display.
Figure 9C:
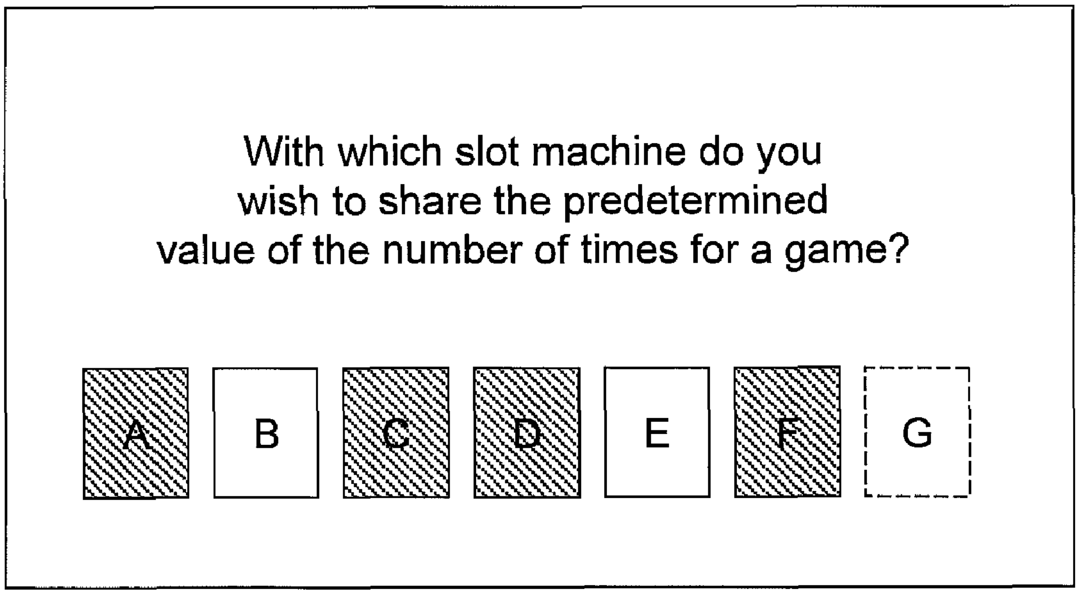
FIG. 9C is a view showing an exemplary display on the display.

The game selection processing will now be described. FIG. 8 is a flowchart showing the subroutine of the game selection processing. FIG. 9A through FIG. 9C are views showing an exemplary display on a display. The game selection processing to be described hereinafter is carried out through the cooperation of the main CPU 41 of the slot machine 10 and the CPU 201 of the game server 200.

The main CPU 41 of the slot machine 10 carries out the following processing at steps S10 through S16. At step S10, the main CPU 41 carries out selection screen display processing. More specifically, the main CPU 41 displays, at a lower side of the display block 28, a selection image urging the player to select whether or not he/she will enter the Link game, as shown in FIG. 9. The player inputs the selection on whether or not he/she will enter the Link game by touching arbitrary portions on the touch panel 69. For instance, if the player enters the Link game, he/she will select the selection image corresponding to "YES". If the player continues playing the Stand-Alone game without entering the Link game, he/she will select the selection image corresponding to "NO".

Next, at step S11, the main CPU 41 of the slot machine 10 judges whether or not the player touched the "YES" selection image and selected the Link game at step S10. As a result of the judgment, if the main CPU 41 judges that the Link game was not selected (S11: NO), the routine proceeds to step S12 at which the Stand-Alone game processing is executed. If the main CPU 41 judges that the Link game was selected (S11: YES), the routine proceeds to step S13 at which information concerning entry to the Link game is transmitted to the game server 200.

Next, at step S14, the main CPU 41 of the slot machine 10 receives number-of-player information from the game server 200. At step S15, the main CPU 41 judges whether or not the number of players entering the Link game is 2 or more, based on the received number-of-player information. If the main CPU 41 judges that the number of players entering the Link game is below 2, the routine reverts to step S13, and the steps S13 through S15 as previously described are repeated. Alternatively, if main CPU 41 judges that the number of players entering the Link game is 2 or more, the routine proceeds to step S16.

Next, at step S16, the main CPU 41 of the slot machine 10 executes Link game processing and at the same time, transmits start information for the Link game processing to the game server 200. The start information for the Link game processing includes permission information concerning sharing the predetermined value of the number of times for the game and permission information concerning selecting the common slot machine(s) that shares the above-mentioned predetermined value. As shown in FIG. 9B, the main CPU 41 displays on a display block 28, a selection image prompting whether or not to share the predetermined value of the number of times for the game with the other slot machines. As shown in FIG. 9C, the main CPU 41 displays on the display block 28, a selection image prompting the player to select whether to share the predetermined value of the number of times for the game with which slot machines (A, B, C, D, E, F and G) that have entered the Link game. For instance, as shown in FIG. 9B, in a case where the predetermined value is not shared and the selection image corresponding to NO has been selected by the player at the slot machine G, the main CPU 41 displays the location of the slot machine G in a blanked manner, as a blank image, as indicated by the broken line "G" shown in FIG. 9C.

The CPU 201 of the game server 200 carries out processing at the following steps S20 through S24. At step S20, the CPU 201 receives Link game entry information from the slot machine 10, which information has been transmitted at step S13 described hereinbefore. Next, at step S21, the CPU 201 of the game server 200 displays, on the common display 300, that entry to the Link game is accepted. At the following step S22, the CPU 201 transmits the number-of-player information for the Link game to each slot machine 10. Next, at step S23, the CPU 201 receives the Link game processing start information which was transmitted at the above-mentioned step S16, from the slot machine 10 and at the same time, recognizes the slot machine 10 at which the Link game processing has started.

At step S24, the CPU 201 of the game server 200 sets a predetermined value (for instance, 100 times) to the number of times for the game, the value being shared among the plurality of gaming machines. Specifically, the CPU 201 stores, in RAM 203, the predetermined value (for instance, 100 times) of the number of times for the game, the value being shared amongst all the slot machines 10 that have entered the Link game, based on the start information for the Link game processing received from the slot machines 10 at step S23. Here, the predetermined vale of the number of times for the game thus set is a target value for consuming a game in all the slot machines 10 that have entered the Link game. The predetermined value of the number of times for the game which has been stored in the RAM 203 is held until a reset processing for a predetermined value of the number of times for the game is carried out in the payout processing (step S115 in FIG. 10) depending on the outcomes of the common game during in the Link game to be described hereinafter.

Figure 10:
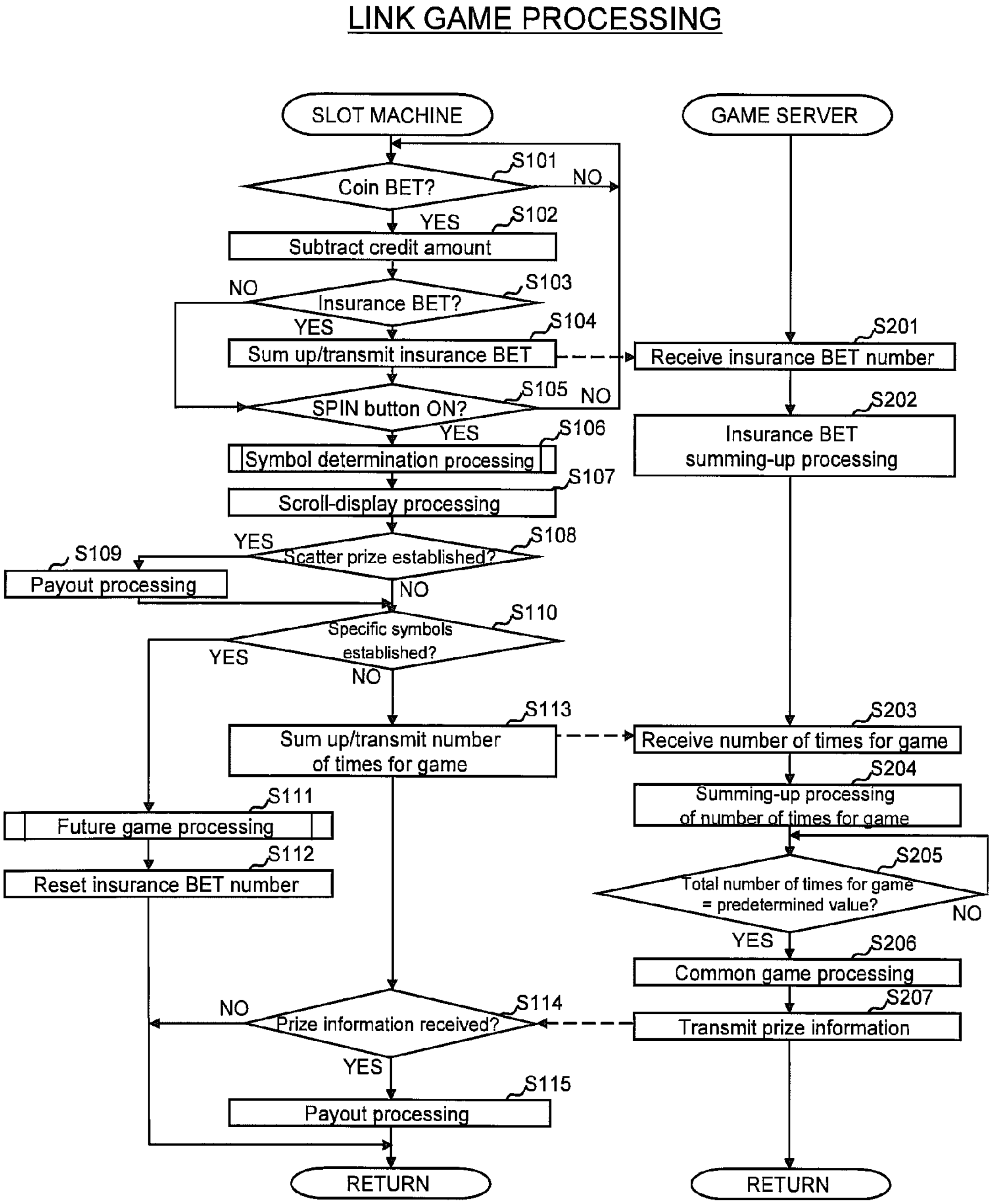
FIG. 10 is similar to FIG. 1 and is a flowchart showing a subroutine of the Link game processing.
Figure 11A:
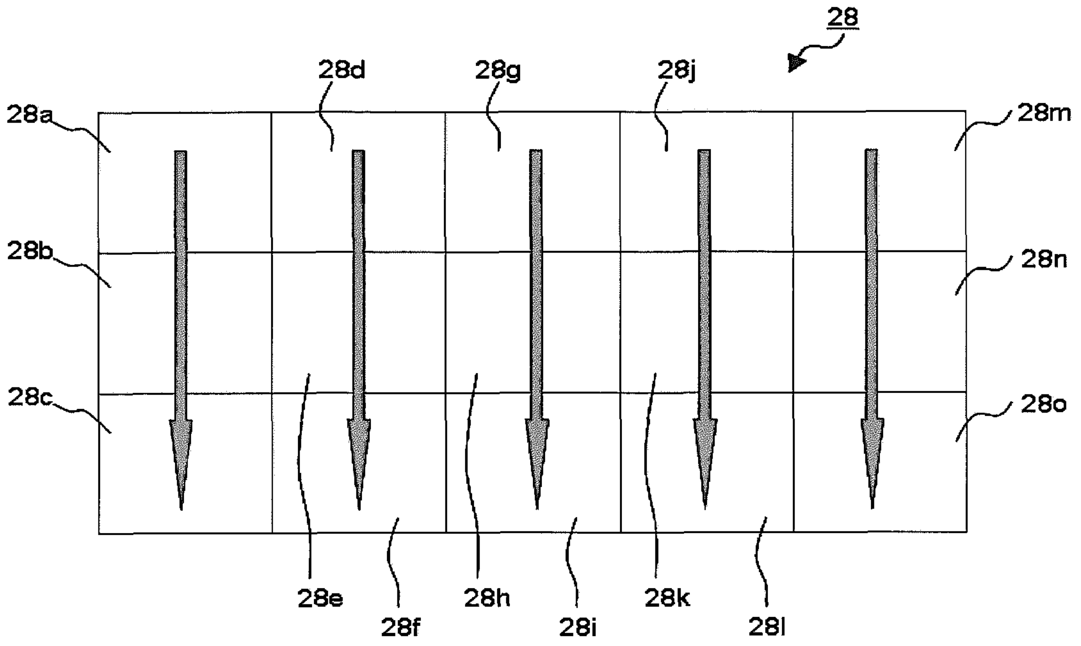
FIG. 11A is a view showing an exemplary display on the display.
Figure 11B:
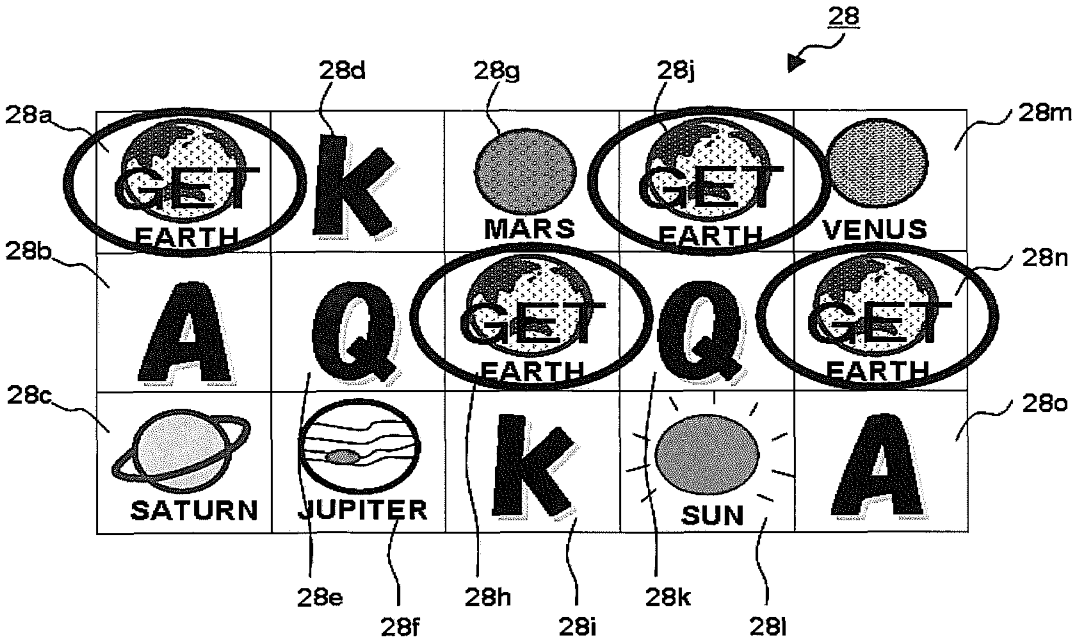
FIG. 11B is a view showing an exemplary display on the display.

Next, the Link game processing will be described. FIG. 10 is the same as FIG. 1, and is a flow chart showing the subroutine for the Link game processing. FIG. 11A and FIG. 11B are views showing an exemplary display on the display. The Link game processing to be described hereinafter is carried out through the cooperation of the main CPU 41 of the slot machines 10 and the CPU 201 of the game server 200.

The main CPU 41 of the slot machine 10 carries out the following processing at steps S101 through S115. First, at step S101, the main CPU 41 judges whether or not coins have been betted. In this processing operation, the main CPU 41 judges whether or not the input signal output from the 1-BET switch 26S has been received when the 1-BET button 26 has been operated; or, alternatively, whether or not the input signal output from the MAX-BET switch 27S has been received when the MAX BET button 27 has been operated. In a case where the main CPU 41 judges that no coins have been betted (S101: NO), routine reverts to step S101. Alternatively, in a case where the main CPU 41 judges that coins have been betted (S101: YES), the routine proceeds to step S102.

Next, at step S102, in a case where it is judged that coins have been betted at step S101, the main CPU 41 of the slot machines 10 performs processing of subtracting the credit amount stored in the RAM 43 in accordance with the number of betted coins. The main CPU 41 stores in the RAM 43 the credit amount after subtracted.

First, at step S103, the main CPU 41 of the slot machine 10 judges whether or not the insurance BET has been placed. More specifically, the main CPU 41 judges whether or not the input signal output from the INSURANCE BET switch 90S has been received when the INSURANCE BET button 90 has been operated. In a case where the main CPU 41 judges that the insurance BET has been placed (S103: YES), the routine proceeds to step S104. Alternatively, in a case where the main CPU 41 judges that no insurance BET has been placed (S103: NO), the routine proceeds to step S105.

Next, at step S104, the main CPU 41 of the slot machine 10 counts the insurance BET accepted at step S103 in an accumulative manner and at the same time, stores the counted insurance BET number in the RAM 43. Then, the main CPU 41 transmits the insurance BET information stored in the RAM 43 to the game server 200.

Next, at step S105, the main CPU 41 of the slot machine 10 judges whether or not the SPIN button 23 has been turned ON. Specifically, the main CPU 41 judges whether or not the input signal output from the SPIN switch 23S has been received when the SPIN button 23 has been depressed. In a case where the main CPU 41 judges that the SPIN button 23 has not been turned ON (S105: NO), the routine reverts to step S101, and, alternatively, in a case where the CPU judges that the SPIN button 23 has been turned ON (S105: YES), the routine proceeds to step S106. In a case where it is judged that the SPIN button 23 has not been turned ON (for example, in a case where an instruction has been input to terminate a game without turning ON the SPIN button 23), the main CPU 41 cancels acceptance of a credit amount subtraction result of step S102.

Next, at step S106, the main CPU 41 of the slot machine 10 performs symbol determination processing. Specifically, in a case where the main CPU 41 judges that the SPIN button 23 has been turned ON at step S105, it determines a code No. at the time of stopping the symbols by executing the symbol determination programs stored in the RAM 43. This processing operation will be described later in detail with referring to FIG. 12. The present embodiment describes a case of determining one or plural prizes from among plural types of prizes by determining symbols displayed in a stopped state. However, the present invention is not limitative thereto, and, for example, is applicable to a case in which one or a plurality of prizes selected from among the plural types of prizes are determined, and then, the combinations of symbols displayed in a stopped state are determined based upon the above-mentioned prizes.

Next, at step S107, the main CPU 41 of the slot machine 10 performs scroll-display processing. Specifically, the main CPU 41 starts display of plural types of symbols in a scrolled manner, and then, performs display control so that the symbols determined at step S107 are displayed in a stopped state in display blocks 28, concurrently when the display in a scrolled manner is stopped after the elapse of a predetermined time. In the present embodiment, display of the plural types of symbols in a scrolled manner is started in the direction of the illustrated arrows, as shown in FIG. 11A.

Next, at step S108, the main CPU 41 of the slot machine 10 judges whether or not a scatter prize is established. Specifically, the main CPU 41 judges whether or not three or more trigger symbols for the scatter prize are displayed in a stopped state in any of display blocks 28, and the scatter prize is established. More specifically, this CPU judges whether or not three or more symbols of the same type, from among "JUPITER", "SATURN", "SUN", "VENUS", "MARS", "MERCURY", "K", "J", "Q", and "A", are displayed in a stopped state in any of the display blocks 28, based on FIG. 5.

In a case where the main CPU 41 judges that the scatter prize is established, based upon FIG. 5 (S108: YES), the routine proceeds to step S109 at which coin payout processing is performed. In a case where this CPU 41 judges that the scatter prize is not established (S108: NO), the routine proceeds to step S110 without performing coin payout.

Next, at step S109, the main CPU 41 of the slot machine 10 executes payout processing. Specifically, in a case where the main CPU 41 judges that three or more trigger symbols for the scatter prize of the same type have been displayed in a stopped state at step S108, this CPU executes payout of a predetermined number of coins, which corresponds to the types and number of symbols displayed in a stopped state and the BET number, based upon FIG. 5. In the present embodiment, as shown in FIG. 11B, three or more trigger symbols for the scatter prize, are not rearranged in display blocks 28. Thus, the payout of coins as the scatter prize, as shown in FIG. 11B, is not performed.

Next, at step S110, the main CPU 41 of the slot machine 10 displays a predetermined number of trigger symbols for the BONUS in a stopped state, and judges whether or not a BONUS win is established. The process at step S110 is carried out in the case that it is judged that a scatter prize is not established at step S108 (S108: NO); or alternatively, this process is carried out in the case that the coin payout processing after the scatter prize has been established at step S109 is terminated. Hereinafter, the main CPU 41 judges whether three or more "EARTH" symbols which are the trigger for BONUS have been displayed in a stopped state on any of the display blocks 28. In a case where the main CPU 41 judges that the BONUS win is established (S110: YES), the routine proceeds to step S111. Alternatively, in a case where the main CPU 41 judges that the BONUS win is not established (S110: NO), the routine proceeds to step S113. In the present embodiment, it is judged that the BONUS win is established ("BONUS IN is set"), as four "EARTH" symbols which are the trigger for the BONUS are displayed in a stopped state on the display blocks 28, as shown in FIG. 11B.

Next, at step S111, the main CPU 41 of the slot machine 10 executes future game processing. Specifically, the main CPU 41 reads, from the RAM 43, a program for performing a future game at the time of executing future game processing. Then, at the time of starting the future game, the main CPU 41 executes the random number generation program included in the symbol determination programs to select a random number value. Then, the main CPU 41 executes a free game by a predetermined number of times based on the selected random number value. After that, this main CPU 41 executes coin payout based on the number of coins that were paid out, the coins being acquired in the future game processing, and then terminates this subroutine. The future game processing will be described later in detail with referring to FIG. 13.

Next, at step S112, the main CPU 41 of the slot machine 10 resets the value of the insurance BET number stored in the RAM 43 at step S105 to "0". The main CPU 41 then terminates this subroutine.

Next, at step S113, in a case where it is judged at step S110 that the BONUS win is not established, the main CPU 41 of the slot machine 10 adds one count to a game number-of-time counter, in an accumulative manner, and at the same time, stores the number of times for the game after the addition in the RAM 43. The main CPU 41 transmits information on the number of times for the game, the information being stored in the RAM 43, to the game server 200.

Next, at step S114, the main CPU 41 of the slot machine 10 judges whether or not prize information in accordance with an outcome of the common game to be described later has been received from the game server 200. In a case where it is judged that prize information has not been received (S114: NO), the main CPU 41 terminates the subroutine. Alternatively, in a case where it is judged that prize information has been received (S114: YES), the routing proceeds to step S115 and the main CPU 41 executes payout processing of a predetermined number of coins based on the received prize information. The main CPU 41 terminates the subroutine after the coin payout processing at step S115 has been terminated.

In a case that the main CPU 41 judges that the scatter prize is not established (S108: NO) and in a case where this CPU judges that the BONUS prize is not established (S110: NO), it is determined to be "losing", that does not come under any of coin payouts (S115) based on the prize information. The above-mentioned "losing" denotes a case in which no coin payout is performed.

The operation of the game server 200 will next be described. The CPU 201 of the game server 200 carries out the processing at the following steps S201 through S207. First, at step S201, the CPU 201 receives the insurance BET information transmitted from the slot machine 10 at the above-mentioned step S104. The CPU 201 stores the insurance BET number accepted at the slot machine 10 like with the slot machine side, in the RAM 203, based on the received insurance BET information. The RAM 203 stores the insurance BET number for each slot machine 10.

Next, at step S202, the CPU 201 of the game server 200 carries out summing-up processing of the insurance BET number. Specifically, the CPU 201 executes a processing of summing up the respective insurance BET numbers of the slot machines 10, the numbers being stored in the RAM 203, at step S201. At the same time, the CPU 201 stores the value of the summing-up result in the RAM 203. For instance, if two slot machines enter the Link game, and the insurance BET numbers invested in the two slot machines 10 are 500 BET and 650 BET, respectively, the game server 200 sums up these BET numbers (500+650) and stores the result "1150" in the RAM 203.

Next, at step S203, the CPU 201 of the game server 200 receives information concerning the number of times for the game. Specifically, the CPU 201 receives this information concerning the number of times for the game transmitted from the slot machines 10 at the above-mentioned step S113, and stores the number of times for the game executed in the slot machine 10 in the RAM 203, based on the information on the number of times for the game thus received.

Next, at step S204, the CPU 201 of the game server 200 carries out a summing-up processing of the number of times for the game. Specifically, the CPU 201 carries out processing of summing up the respective numbers of times for the game executed in the slot machines, the number being stored in the RAM 203 at the step S203, and at the same time, stores the resulting total value of the number of times for the game in the RAM 203. For instance, if the numbers of times for the game executed in two slot machines 10 are 30 times and 65 times respectively, the game server 200 sums up these numbers of times for the game (30+65), and then, stores the resulting value "95" in the RAM 203.

Next, at step S205, the CPU 201 of the game server 200 judges whether or not the total number of times for the game resulting from step S204 (for instance, 95 times) reaches a predetermined value of the number of times for the game (for instance, 100 times) which was set at the above-mentioned step S24. That is, the CPU 201 judges whether the total number of times for the game executed in the plurality of slot machines that entered the Link game has reached a predetermined value of the number of times for the game (100 times)

that was set in advance. Then, in a case where the main CPU 41 judges that the total number of times for the game has reached the predetermined value set in advance (S205: YES), the routine proceeds to step S206. Alternatively, in a case where the main CPU 41 judges that the total number of times for the game has not reached the predetermined value set in advance (S205: NO), step S205 is repeated.

Next, at step S206, the CPU 201 of the game server 200 executes common game processing. Specifically, the CPU 201 reads the common game program from the ROM 202 and executes the common game based on the read common game program, and at the same time, displays the executed common game on the common display 300. The CPU 201 also transmits information concerning the common game executed on the common display 300 to the slot machines 10. In this common game, a free game is carried out by a predetermined number of times amongst the plurality of slot machines 10 and a prize is awarded to the slot machine 10 at which the number of times for the BONUS win first reaches the value (for instance, 50 times) stored in the RAM 43.

Next, at step S207, the CPU 201 of the game server 200 transmits the prize information based on the outcomes of the common game carried out at step S206, to the slot machine 10. The prize information represents information concerning the award of prizes, inclusive of the total insurance BET value (for instance, 1150) stored in the RAM 203 at step S202. Then, the CPU 201 sets the flag for the reset processing to ON and resets the predetermined value of the number of times for the game (for instance, 100), stored in the RAM 43, to "0".

Figure 12:
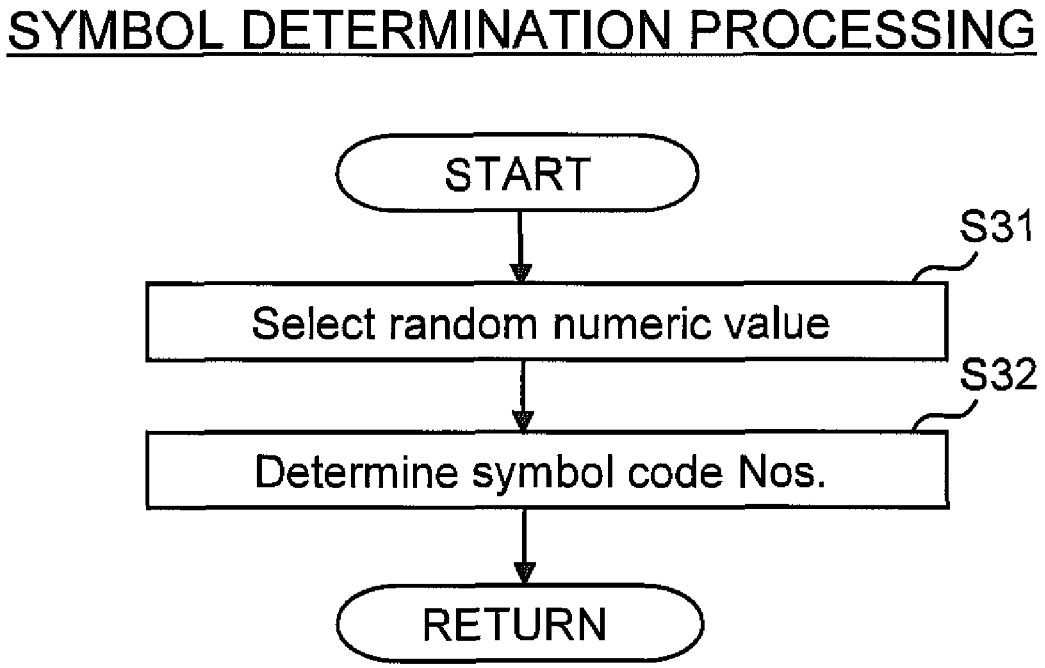
FIG. 12 is a flowchart showing a subroutine of symbol determination processing.

Next, symbol determination processing will be described. FIG. 12 is a flowchart showing a subroutine of symbol determination processing executed by the slot machine 10 at step S107 shown in FIG. 10. In this processing, the main CPU 41 of the slot machines 10 executes the symbol determination program stored in the RAM 43.

First, at step S31, the main CPU 41 of the slot machine 10 executes processing of selecting a predetermined random number value. Specifically, the main CPU 41 executes the random number generation program included in the symbol determination program, thereby selecting five random number values corresponding to each of the symbol columns (5 columns) from among the numeric values ranging from 0 to 255. The present embodiment describes a case in which random numbers are generated on a program (a case in which so-called software random numbers are employed). In the present invention, however, a random number generator is provided whereby random numbers may be extracted from the random number generator (so-called hardware random numbers may be employed).

Next, at step S32, the main CPU 41 of the slot machine 10 determines code Nos. of symbol columns (refer to FIG. 4), based upon the five random number values selected at step S31. Code Nos. of the symbol columns correspond to those of symbols displayed in a stopped state on the display blocks 28. The main CPU 41 determines prizes by determining code Nos. of symbol columns. As shown in FIG. 4, for example, in a case where the main CPU 41 determines that code Nos. of symbols are "00", "01", "02", "03", and "04", the prize is determined to be "EARTH".

Figure 13:
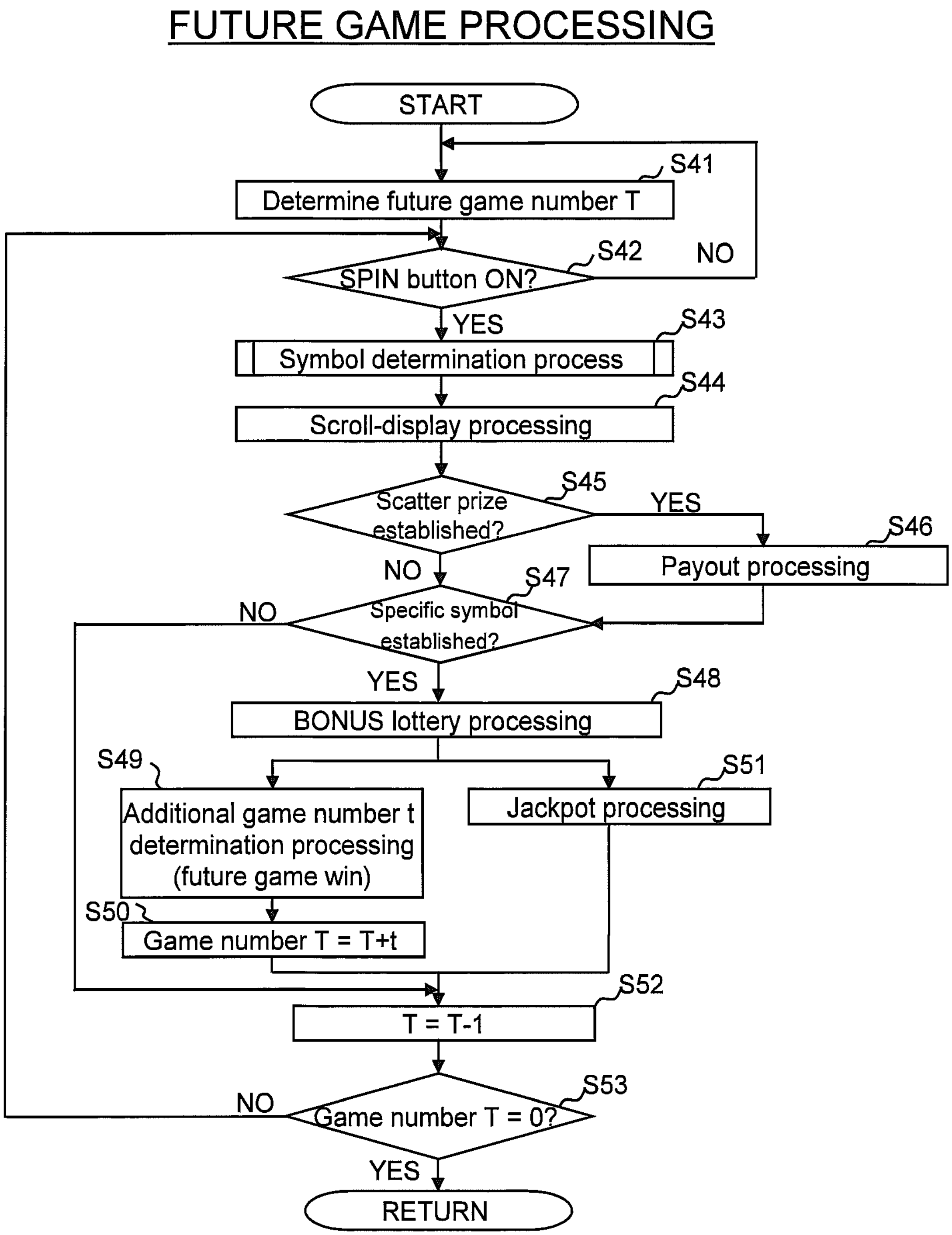
FIG. 13 is a flowchart showing a subroutine of future game processing.

Next, future game processing will be described. FIG. 13 is a flow chart showing a subroutine of the future game processing executed by the slot machine 10 at step S111 shown in FIG. 10. In the future game processing, a free game is executed by a predetermined number of times, without inputting a BET number by use of the BET buttons 26 and 27.

First, at step S41, the main CPU 41 of the slot machine 10 selects future game (free game) number T executed in the future game. Specifically, the main CPU 41 determines game number T from among any of 10 to 25 games, based upon the random number values obtained by executing the random number generation programs stored in the RAM 43. The main CPU 41 stores, as data in the RAM 43, the game number T executed during the thus determined future game.

Next, at steps S42 through S47, the main CPU 41 executes SPIN button input judgment processing, symbol determination processing, scroll display processing, scatter prize judgment processing, payout processing and a BONUS win judgment processing. Processing carried out at each of steps S43 through S47 is substantially the same as that at each of the steps S105 through S110 shown in FIG. 10, and therefore, further description thereof is hereby omitted.

Next, at step S48, the main CPU 41 of the slot machine 10 executes BONUS lottery processing. More specifically, if "BONUS IN" is set at step S47, the main CPU 41 refers to the BONUS lottery table stored in ROM 42 and randomly selects whether to shift to the future game or payout a progressive jackpot. Hereinafter, the main CPU 41 selects a predetermined random number value from a plurality of random number values shown in the BONUS lottery table to select either of the above-mentioned future game and the progressive jackpot.

Next, at step S49, if a future game is selected by carrying out the BONUS lottery at step S48, during the future game, the main CPU 41 of the slot machine 10 newly selects a number of times t in repeating the future game (free game). At step S50, the main CPU 41 adds the number of times t for repetition selected at step S49 to the game number T for the present bonus game. Then, the main CPU 41 stores the number of times for the game T=(T+t) obtained through the addition at step S50, in the RAM 43. Thus, if a future game is won during the future game, the remaining number of future game increases. Specifically, if the player shifted to a total of 20 future games at first, when the player wins a number of 17 future games in the $12^{th}$ future game, a future game will be carried out thereafter by 25 (20−12+17) times.

Next, at step S51, if the main CPU 41 of the slot machine 10 selects a progressive jackpot during the future game, by BONUS lottery at step S48, the main CPU 41 executes jackpot processing during the future game. Specifically, the main CPU 41 executes payout of a large amount of coins based on the progressive value stored in RAM 43.

Next, at step S52, the main CPU 41 of the slot machine 10 reads game number T of the future game stored in the RAM 43, and then, subtracts the value of the read game number T by 1. Then, the main CPU 41 stores again the number of times for the game T after subtraction in the RAM 43.

Next, at step S53, the main CPU 41 of the slot machine 10 judges whether or not the game number T of the future game has reached the number of times determined at step S41. Specifically, the main CPU 41 makes determination in accordance with whether or not the game number T stored in the RAM 43 is set to 0. Then, in a case where the game number T is not set to 0 (S53: NO), i.e., in a case where the number of times in executing the future game fails to reach the game number determined at step S41, the main CPU 41 reverts the routine to step S42, and then, repeats the processing at the steps S42 to S53 mentioned above. On the other hand, in a case where it is judged that the game number T of the future game is set to 0 (S53: YES), i.e., in a case where it is judged that the number of times determined at step S41 has been reached, the main CPU 41 terminates this subroutine.

Figure 14:
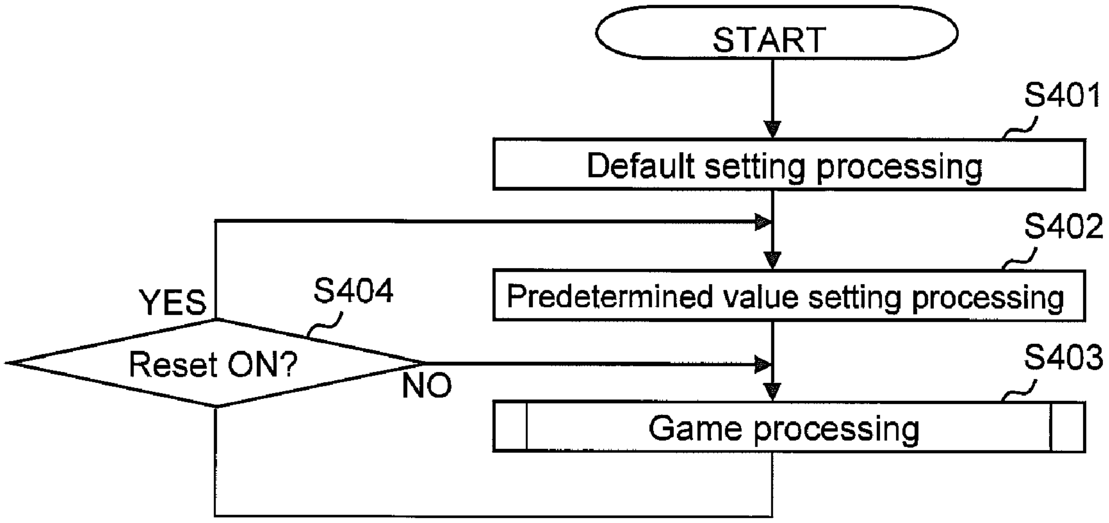
FIG. 14 is a flowchart showing a subroutine of main processing.
Figure 15:
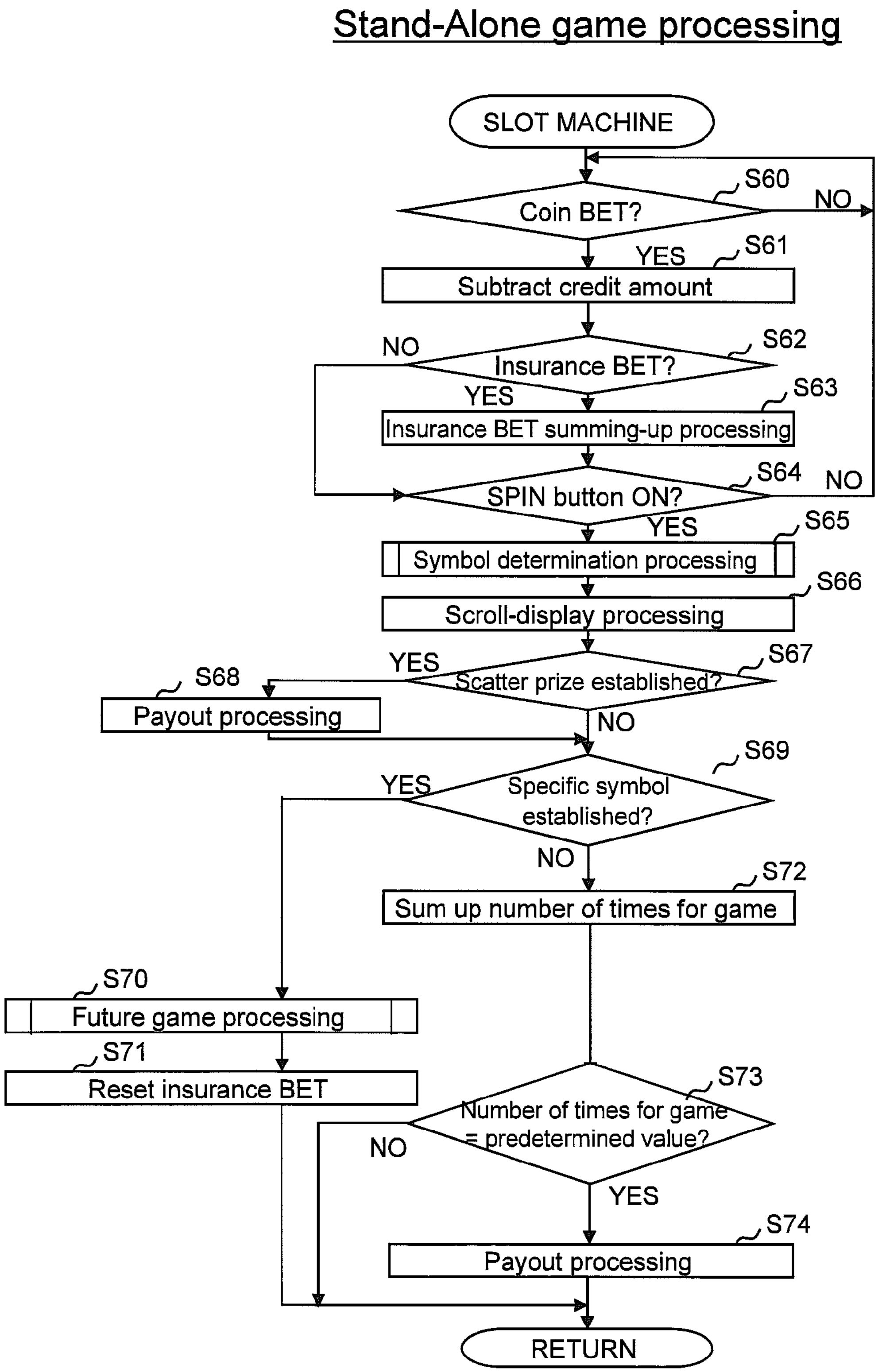
FIG. 15 is a flowchart showing a subroutine of Stand-Alone game processing.

Next, the Stand-Alone game will now be described. FIG. 14 is a flow chart showing a subroutine of main processing. FIG. 15 is a flow chart showing a subroutine of Stand-Alone game processing. The Stand-Alone game processing is carried out in a case where the main CPU 41 of the slot machine 10 judges at step S11 shown in FIG. 8 that the player does not wish to enter the Link game.

In the main processing shown in FIG. 14, at step S401, the main CPU 41 first executes default setting processing. More specifically, the main CPU 41 executes a BIOS stored in the ROM 42 and then expands the compressed data incorporated in the BIOS into the RAM 43. After this, the main CPU 41 executes the BIOS expanded in the RAM 43 and performs diagnosis and reset of the respective peripheral devices.

Next, at step S402, the main CPU 41 executes a predetermined value setting processing of the number of times for the game. More specifically, the main CPU 41 stores the predetermined value of the number of times for the game (for instance, 100 times) in the RAM 43.

Next, at step S403, the main CPU 41 executes game processing. Here, the game processing includes the Stand-Alone game processing shown in FIG. 15 to be described later.

Next, at step S404, the main CPU 41 judges whether or not the flag for the reset operation is turned to ON. More specifically, the main CPU 41 judges whether or not an insurance BET reset processing (step S71 in FIG. 15) is carried out after the future game processing. Then, the main CPU 41 judges, at step S74 to be described later, whether or not the flag for the reset processing for the predetermined value of number of times for the game is set to ON and reset processing is being carried out. If it is judged that the reset processing is being carried out, the routine reverts to step S402. After the above-mentioned predetermined value of the number of times for the game is set again, the game processing at step S403 is repeatedly executed. Alternatively, if it is judged that the reset processing for the insurance BET is not carried out at step S71, the game processing at step S403 is repeatedly carried out.

In the Stand-Alone game processing shown in FIG. 15, the slot machine 10 operates independently from the other slot machines. Here, the following steps S60 through S73 are repeatedly executed until a predetermined value of the number of times for the game (for instance, 100 times), which has been set at step S402, has been consumed. If, as a result of repeating the game, the current number of times for the game has reached the predetermined value of the number of times for the game (for instance, 100 times) set at step S402 (S73: YES), coin payout is carried out correspondingly with the insurance BET invested in an accumulative manner (S74). At step S74, the flag for the reset processing is set to ON, and the predetermined value of the number of times for the game (for instance, 100), stored in the RAM 43, is reset to "0". The processes at steps S60 through S72 are similar to steps S101 through S113 shown in FIG. 10 in that reception and transmission with the game server 200 is not carried out, and thus further description thereof is hereby omitted.

Figure 16:
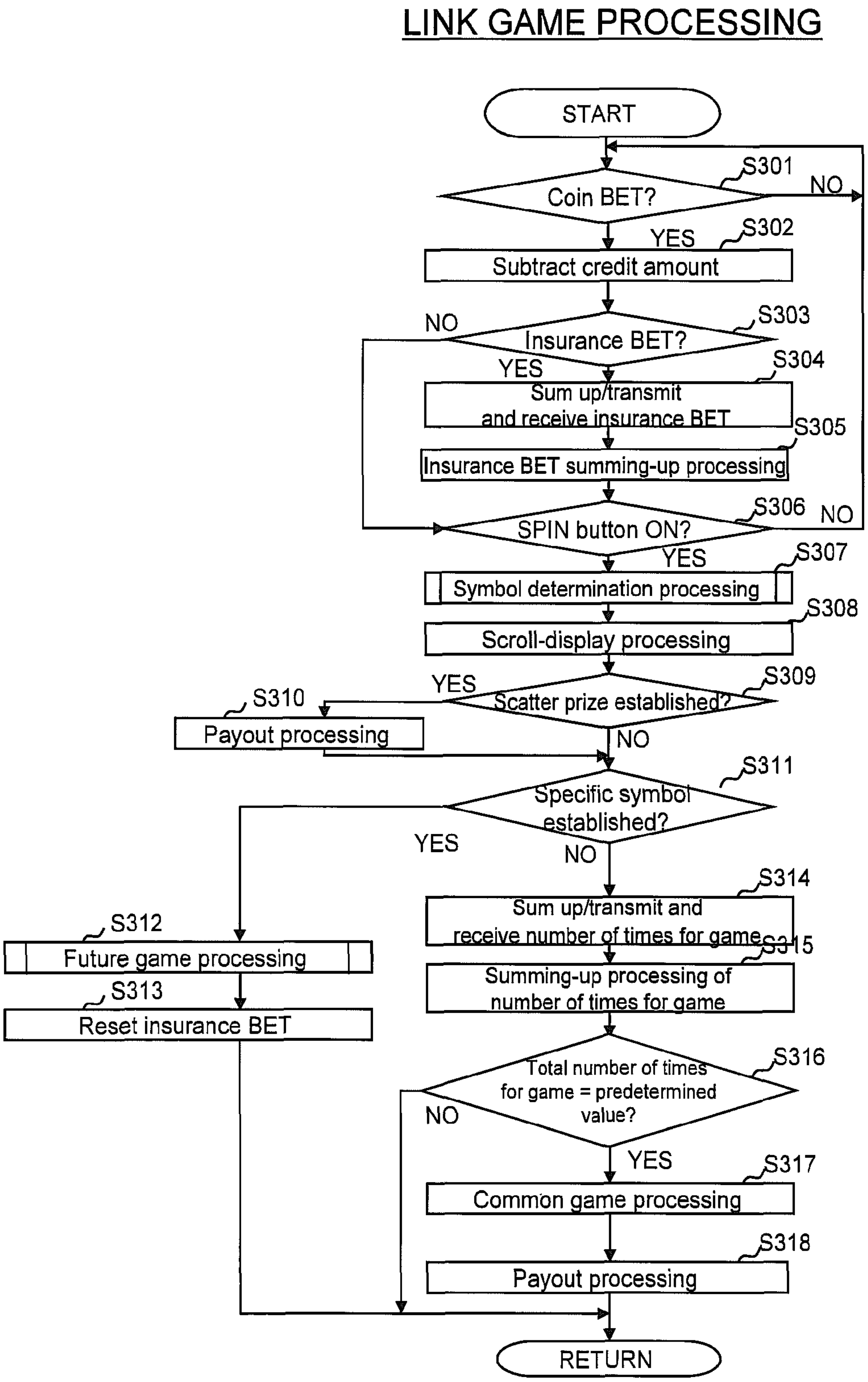
FIG. 16 is a flowchart showing a subroutine of Link game processing according to another embodiment.

FIG. 16 is a flowchart showing a subroutine of the Link game processing according to another embodiment. The Link game processing shown in FIG. 16 is different from the above-mentioned Link game processing shown in FIG. 10 in that the game is carried out among the respective slot machines 10 without the interposition of the game server 200. Hereinafter, the main parts of the Link game processing executed by the main CPU 41 of the slot machines 10 will be schematically described based on FIG. 16.

The main CPU 41 of each of the slot machines 10 executes the following processing. In a case where the player makes a request to enter the Link game, the main CPU 41 establishes a communication connection between the plurality of slot machines 10 and then starts Link game processing. The predetermined value which is shared among the plurality of slot machines 10 is stored in the RAM 43 (refer to step S402 shown in FIG. 14). The main CPU 41 accepts the insurance BET which is input from the INSURANCE BET button 90 (step S303), then counts the accepted insurance BET in an accumulative manner, and at the same time, stores the counted value in the RAM 43. The main CPU 41 carries out transmission and reception of insurance BET information stored in the RAM 43 with the other slot machines 10 (step S304). The main CPU 41 then sums up the insurance BET numbers stored in the plurality of slot machines 10, based on the insurance BET information received from the other slot machines 10, and at the same time, stores the resulting value in the RAM 43. Then, the plurality of types of symbols arranged in the display block 28 are automatically re-arranged (step S308).

The main CPU 41 of each of the slot machines 10 carries out the following processing. The main CPU 41 counts the number of times for the game in an accumulative manner on a game-by-game basis, and at the same time, stores the thus counted value in the RAM 43 and carries out transmission and reception of information concerning the number of times for the game stored in the RAM 43, with the other slot machines 10 (step S314). Then, based on the information concerning the number of times for the game received from the other slot machines 19, the main CPU 41 sums up the numbers of times for the game in the plurality of slot machines 10 and at the same time, stores the resulting value in the RAM 43 (step S315). As a result of repeating the game, the main CPU 41 judges whether the resulting total number of times for the game reaches the predetermined value set in advance (step S316). If it is judged, as a result of the judgment, that the resulting total number of times for the game reaches the predetermined value, the main CPU 41 displays the common game executed in the plurality of slot machines onto the common display 300, for instance, and selects at least one slot machine 10 from the plurality of slot machines 10 in which the predetermined value was set based on the outcomes of this common game (step S317). A prize is then awarded which includes the total insurance BET stored in the RAM 43 (step S318).

In the above-mentioned example, it was described that the predetermined value set in advance is determined by comparison based on the total number of times for the game in the plurality of slot machines 10. However, the present invention is not limitative thereto and the predetermined value may be determined by comparison based on the total number of times of the predetermined symbol arrangement state in the plurality of slot machines 10. In this case, the main CPU 41 judges whether the predetermined symbol arrangement state is established on the display on which the symbols have been re-arranged. If it is judged that this arrangement state is established, the main CPU 41 counts the predetermined symbol arrangement state as one count, in an accumulative manner, and at the same time, stores the counted value in the RAM 43. The predetermined symbol arrangement state includes the state of predetermined symbol combination or the state of the predetermined number of displayed symbols.

In the above-mentioned example, it was described that the prize, inclusive of the total insurance BET, as insurance function, is awarded to a specific slot machine 10 based on the outcome of the common game. However, the present invention is limitative thereto, and may take the following form, as well. For instance, a first table for distributing prizes to the plurality of slot machines and a second table for awarding prizes to a specific slot machine 10, both tables being selectively changeable by the player, may be provided and the prize may be awarded to the plurality of slot machines or to a specific slot machine based on a table corresponding to the selection request from the player.

In the above-mentioned example, it was described that the predetermined value to be shared among the plurality of slot machines 10 is set by the player who arbitrarily selects the other slot machine 10 he/she desires. However, the present invention is not limitative thereto, and the predetermined value to be shared may be set after permission is acquired from the other player at the selected slot machine 10. In this case, if permission is not acquired from the other player, resulting in a rejection of the invitation, a predetermined value to be shared by the plurality of slot machines is set, the predetermined value excluding the slot machine 10 at which the rejection was made. The predetermined value may be commonly set for the other slot machines which were automatically and randomly selected.

In the above-mentioned example, it was described that the slot machines execute two types of games, inclusive of the Stand-Alone game and the Link game. However, the present invention is not limitative thereto and slot machines which execute only the Link game may be employed.

While it was described in the above example that the predetermined value of the number of times for the game is fixed, the present invention is not limitative thereto. This predetermined value may be a variable value which is randomly determined on a game-by-game basis by selecting a predetermined random numeric value.

While it was described in the above-mentioned example that placing the insurance BET by operating the INSURANCE BET button 90 is a voluntary act carried out by the player, the present invention is not limitative thereto. For example, as is the case with the BET for the game start, the insurance BET may be a required act for executing the game.

While the above-mentioned example described a case of displaying a total of 15 symbols made up of 5 columns and 3 rows, a display mode of symbols in the present invention is not limitative to 5 columns and 3 rows. This display mode is applicable to various combinations such as a combination of symbols made up of 3 columns and 3 rows. In addition, while the above-mentioned example described a case in which symbols are displayed in a scrolled manner by display blocks, these symbols may be individually displayed in a scrolled manner.

While the above-mentioned example described that symbols are displayed in a scrolled manner using a liquid crystal display device or the like, the present invention is not limitative thereto. In a case where mechanical reels are employed, the symbols may be graphically displayed on the surface of the mechanical reels.

While the embodiment according to the present invention has been described, the description presents only some of the specific examples and is not intended to limit the present invention in any way and specific constructions of each means and the like can be properly changed in terms of design. Besides, the effects described in the embodiment of the present invention are only the most preferable effects generated from the present invention and the effects to be derived from the present invention are not limitative thereto.

The more important features of the invention have thus been outlined, rather broadly, in order that the aforementioned detailed description thereof may be better understood, and in order that the present contribution to the art may be better appreciated. There are, of course, additional features of the invention that were described above and which formed the subject matter of the claims appended hereto. In this respect, upon explaining at least one embodiment of the invention in detail, it is to be understood that the invention is not limitative in its application to the details of construction and to the arrangements of the components set forth in the aforementioned description or illustrated in the drawings. According to the invention, other embodiments can be variously practiced and carried out as well. Also, it is to be understood that the phraseology and terminology employed herein are merely intended for the descriptive purpose and should not be regarded as limiting. As such, those skilled in the art will appreciate that the conception, upon which this disclosure is based, may readily be utilized as a basis for the designing of other systems and methods for carrying out the several purposes of the present invention. It is important, therefore, that the claims be regarded as including such equivalent constructions insofar as they do not depart from the spirit and scope of the present invention. Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way. These matters together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matters in which there are illustrated preferred embodiments of the invention.

The detailed descriptions aforementioned may be presented in terms of program procedures executed on a computer or network of computers. These procedural descriptions and representations are the means used by those skilled in the art to most effectively convey the substance of their work to others skilled in the art. A procedure is here, and generally, conceived to be a self-consistent sequence of steps leading to a desired result. These steps require physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities. Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine and/or manual operations. Useful machines for performing the operation of the present invention include general purpose digital computers or similar devices. The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general-purpose machines may be used with programs written in accordance with the teachings herein, or it may prove more convenient to construct more specialized apparatus to perform the required method steps. The required structure for a variety of these machines will appear from the description given.

What is claimed is:

1. A game system, comprising:
a plurality of gaming machines communicating with each other via a communication network, the plurality of gaming machines each having:
(i) a display device onto which a plurality of types of symbols are arranged;
(ii) an input device to input an insurance BET;
(iii) at least one memory; and
(iv) a controller;
the controller programmed to:
accept information concerning entry to a link game requested by a player at a gaming machine to start the link game;
(a) store a predetermined number of games shared so as to consume a game through cooperation among all the plurality of gaming machines that have entered the link game, in the at least one memory;
(b) accept an insurance BET input with the input device;
(c) count the insurance BET in an accumulative manner and store the counted insurance BET value in the at least one memory;
(d) transmit the counted insurance BET value to other gaming machines and receive the counted insurance BET value information from other gaming machines;
(e) sum the counted insurance BET values received from said other gaming machines, and store the summed insurance BET value in the at last one memory;
(f) automatically re-arrange the plurality of types of symbols arranged on the display device;
(g) count a number games played on a one-game basis, in an accumulative manner, and store the number of games played in the at least one memory;
(h) transmit and receive to and from the other gaming machines, information related to the number of games played, the information being stored in the at least one memory;
(i) sum the number of games played at the plurality of gaming machines, based on the information received from said other gaming machines, and store the summed games played in the at least one memory;
(j) determine whether, as a result of repeating (b) to (i), the summed games played reaches the predetermined number of games set for the link game; and
(k) where a determination is made that the summed games played reaches the predetermined number of games, award a prize to at least one gaming machine of the plurality of gaming machines that have entered the link game, said prize including the summed insurance bet value.

2. The game system according to claim 1, further comprising a central display device communicating with the plurality of gaming machines and configured to display a common game played during the link game among the respective gaming machines that have entered the link game so as to determine a predetermined gaming machine to which a prize including the summed insurance bet value is awarded, wherein:
when the summed games played reaches the predetermined number of games set for the link game, the controller,
displays and executes the common game on the central display device,
awards a prize to at least one gaming machine from among the plurality of gaming machines that have entered the link game based on an outcome of the common game, said prize including the summed insurance bet value, and
resets the predetermined number of games set for the link game so as to terminate the link game.

3. The game system according to claim 1, wherein the plurality of gaming machines each have:
a first table determining distribution of said prize to the plurality of gaming machines; and
a second table determining awarding of said prize to a predetermined gaming machine; and wherein:
the controller:
if it is determined that the summed games played reaches the predetermined number of games, selects between the first table and the second table, based on a request from at least one gaming machine from among the plurality of gaming machines and awards a prize to at least one gaming machine from among the plurality of gaming machines at which the predetermined number of games is stored, said prize including the summed insurance bet value.

4. The game system according to claim 1, wherein the controller, where permission is granted from the plurality of gaming machines to set a predetermined number of games, stores the predetermined number of games to be shared among the plurality of gaming machines that granted said permission, in the at least one memory.

5. The game system according to claim 1, wherein the controller, where a request for prohibiting setting of a predetermined number of games is made from at least one gaming machine from among the plurality of gaming machines, stores the predetermined number of games to be shared among the plurality of gaming machines, excluding the gaming machine from which the request was made, in the at least one memory.

6. The game system according to claim 1, wherein the controller, displays a selection request image for prompting selection on whether to share the predetermined number of games, on the display device.

7. A game system, comprising:
(a) a plurality of gaming machines communicating with each other via a communication network, the plurality of gaming machines each having:
a display device onto which a plurality of types of symbols are arranged;
an input device operable to input an insurance BET; and
at least one memory; and
(b) a central controller communicating with the plurality of gaming machines, the plurality of gaming machines processing (a-1) to (a-6) and the central controller processing (b-1) to (b-5) as follows:
the central controller accepts information concerning entry to a link game requested by a player at a gaming machine to start the link game;
(b-1) the central controller sets a predetermined number of games to be shared so as to consume a game through cooperation among the plurality of gaming machines that have entered the link game;

(a-1) the plurality of gaming machines accept an insurance BET input with the input device;

(a-2) the plurality of gaming machines count the insurance BET in an accumulative manner and store an insurance BET value in the at least one memory;

(a-3) the plurality of gaming machines transmit the insurance BET value stored in the at least one memory to the central controller;

(b-2) the central controller sums the insurance BET values of the plurality of gaming machines, based on the insurance BET values received from the plurality of gaming machines;

(a-4) the plurality of gaming machines automatically re-arrange the plurality of types of symbols arranged on the display device;

(a-5) the plurality of gaming machines count the number of games played on a one-game basis, in an accumulative manner, and store the number of games played in the at least one memory;

(a-6) the plurality of gaming machines transmit the number of games played stored in the at least one memory, to the central controller;

(b-3) the central controller sums the number games played in the plurality of gaming machines, based on the number of games played received from the plurality of gaming machines;

(b-4) the central controller determines, as a result of the plurality of gaming machines repeating the processing at the itemized (a-1) to (a-6), whether the number games played resulting from the summation at (b-3), reaches the predetermined number of games set for the link game at (b-1); and (b-5) the central controller transmits information for awarding a prize to at least one gaming machine from among the plurality of gaming machines that have entered the link game, said prize including the summed insurance BET value, if it is determined at (b-4), that the total number of games played reaches the predetermined number of games set at (b-1).

8. The game system according to claim 7, further comprising a central display device communicating with the central controller, and operable to display a predetermined common game played during the link game among the respective gaming machines that have entered the link game so as to determine a predetermined gaming machine to which a prize including the summed insurance bet value is awarded, wherein:

the central controller, at (b-5), in a case where a determination is made, as a result of said determination at (b-4), that the total number of games played reaches the predetermined number of games set for the link game at (b-1), displays the common game on the central display device, transmits information concerning the award of a prize to at least one gaming machine from among the plurality of gaming machines that have entered the link game, based on an outcome of the common game that is displayed and executed, said prize including the summed insurance BET value at (b-2), and resets the predetermined number of games set for the link game so as to terminate the link game.

9. A game system according to claim 7, wherein: the central controller has:

a first table determining distribution of said prize to the plurality of gaming machines; and a second table determining awarding of said prize to a predetermined gaming machine; and wherein:

the central controller, at (b-5), if it is judged, as a result of said determining at (b-4), that the total number of games played reaches the predetermined number of games set at (b-1), selects between the first table and the second table based on a request from at least one gaming machine from among the plurality of gaming machines, and transmits information for awarding a prize to at least one gaming machine from among the plurality of gaming machines, said prize including the total insurance BET of the summing-up result at the itemized (b-2).

10. The game system according to claim 7, wherein:

the central controller, at (b-1), where permission is granted from the plurality of gaming machines to set a predetermined number of games, sets the predetermined number of games to be shared among the plurality of gaming machines that granted said permission.

11. The game system according to claim 7, wherein:

the central controller, at (b-1), where a request for prohibiting setting a predetermined number of games is made from at least one gaming machine from among the plurality of gaming machines, sets the predetermined number of games to be shared among the plurality of gaming machines, excluding the gaming machine from which said request was made.

12. The game system according to claim 7, wherein:

prior to the processing at (b-1), the plurality of gaming machines display on the display device a selection request image for prompting selection of whether to share the predetermined number of games.

* * * * *